(12) United States Patent
Cusson et al.

(10) Patent No.: US 8,240,109 B2
(45) Date of Patent: *Aug. 14, 2012

(54) SUPPORT SYSTEM FOR SOLAR PANELS

(75) Inventors: Paul R. Cusson, West Hartford, CT (US); Robert J. Voytilla, Hubbard, OH (US)

(73) Assignee: Northern States Metals Company, West Hartford, CT (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/567,908

(22) Filed: Sep. 28, 2009

(65) Prior Publication Data

US 2010/0237029 A1 Sep. 23, 2010

(51) Int. Cl.
*E04D 13/18* (2006.01)
*E04D 13/035* (2006.01)

(52) U.S. Cl. ............ 52/745.05; 52/745.06; 52/173.3; 136/244; 136/245; 126/623

(58) Field of Classification Search .......... 52/173.3, 52/29, 173.1, 171.1, 64, 65, 66, 745.06, 745.05, 52/745.13; 136/244, 245, 243; 126/621–623
See application file for complete search history.

(56) References Cited

U.S. PATENT DOCUMENTS

| | | | |
|---|---|---|---|
| 1,893,481 A | 1/1933 | Adams | |
| 2,673,632 A | 3/1954 | Stiranka | |
| 2,938,068 A | 5/1960 | Silverschotz | |
| 3,210,716 A | 10/1965 | Meacham | |
| 3,261,086 A | 7/1966 | Dunn | |
| 3,844,087 A | 10/1974 | Schultz et al. | |
| 4,006,569 A * | 2/1977 | Kain | 52/204.591 |
| 4,006,731 A | 2/1977 | Carroll | |
| 4,159,604 A | 7/1979 | Burrell | |
| 4,162,595 A | 7/1979 | Ramos et al. | |
| 4,269,173 A | 5/1981 | Krueger et al. | |
| 4,278,072 A | 7/1981 | Ryan et al. | |
| 4,336,413 A * | 6/1982 | Tourneux | 136/251 |
| 4,452,027 A | 6/1984 | Desai | |
| 4,452,234 A | 6/1984 | Withjack | |
| 4,466,424 A * | 8/1984 | Lockwood, Jr. | 126/621 |
| 4,580,385 A | 4/1986 | Field | |
| 4,680,905 A | 7/1987 | Rockar | |

(Continued)

FOREIGN PATENT DOCUMENTS

CN 1900458 A 1/2007

(Continued)

OTHER PUBLICATIONS

Krannich Solar, Inc.; K-2 Systems, Mounting Systems for Solar Technology (7 pages); website http://cms.krannich-solar.com/usa/upload/pdf/K2/image_K2_USA_VIEW.pdf; publication date unknown.

(Continued)

*Primary Examiner* — Phi Dieu Tran A

(74) *Attorney, Agent, or Firm* — Roth, Blair, Roberts, Strasfeld & Lodge

(57) ABSTRACT

Precise parameters are maintained in a support structure for solar panels or other panel-like structures through use of a collapsible folding structure which is preassembled to precise tolerances at a convenient staging site before being collapsed for shipment. Easy installation with unskilled labor is facilitated by attaching one support joist to a substrate and then unfolding the entire support structure.

17 Claims, 16 Drawing Sheets

U.S. PATENT DOCUMENTS

| | | | |
|---|---|---|---|
| 4,721,555 A | 1/1988 | Grosshandler | |
| 4,789,070 A | 12/1988 | Bennett | |
| 4,815,410 A * | 3/1989 | Muhlberger | 114/361 |
| 4,892,632 A | 1/1990 | Morris | |
| 4,966,631 A | 10/1990 | Matlin et al. | |
| 4,977,646 A | 12/1990 | McCraw | |
| 5,125,608 A | 6/1992 | McMaster et al. | |
| 5,143,556 A | 9/1992 | Martin | |
| 5,228,258 A | 7/1993 | Onoda et al. | |
| 5,232,518 A | 8/1993 | Nath et al. | |
| 5,299,396 A | 4/1994 | Raap et al. | |
| 5,308,037 A | 5/1994 | Gonzalez | |
| 5,546,713 A | 8/1996 | Voegele et al. | |
| 5,634,644 A | 6/1997 | Guillon | |
| 5,706,617 A | 1/1998 | Hirai et al. | |
| 5,735,100 A | 4/1998 | Campbell | |
| 5,762,720 A | 6/1998 | Hanoka et al. | |
| 5,946,874 A | 9/1999 | Roberts | |
| 5,969,501 A | 10/1999 | Glidden et al. | |
| 5,986,203 A | 11/1999 | Hanoka et al. | |
| 6,046,399 A | 4/2000 | Kapner | |
| 6,056,283 A | 5/2000 | Gage et al. | |
| 6,065,255 A | 5/2000 | Stern et al. | |
| 6,111,189 A | 8/2000 | Garvison et al. | |
| 6,141,923 A | 11/2000 | Habicht et al. | |
| 6,370,828 B1 | 4/2002 | Genschorek | |
| 6,389,770 B1 | 5/2002 | Santavicca | |
| 6,501,013 B1 | 12/2002 | Dinwoodie | |
| 6,617,507 B2 | 9/2003 | Mapes et al. | |
| 6,672,018 B2 * | 1/2004 | Shingleton | 52/173.3 |
| 6,784,359 B2 | 8/2004 | Clark et al. | |
| 6,799,398 B1 * | 10/2004 | Plevyak | 52/173.3 |
| 6,959,517 B2 | 11/2005 | Poddany et al. | |
| 6,988,344 B1 | 1/2006 | Krueger | |
| 7,012,188 B2 * | 3/2006 | Erling | 136/251 |
| 7,307,209 B2 | 12/2007 | Mapes et al. | |
| 7,406,800 B2 | 8/2008 | Cinnamon et al. | |
| 7,435,897 B2 * | 10/2008 | Russell | 136/244 |
| 7,600,350 B2 * | 10/2009 | Braunstein | 52/173.3 |
| 7,845,120 B2 | 12/2010 | Thome et al. | |
| 7,939,754 B2 | 5/2011 | Richter et al. | |
| 7,987,641 B2 | 8/2011 | Cinnamon | |
| 2002/0088905 A1 | 7/2002 | Hansen | |
| 2003/0015636 A1 | 1/2003 | Liebendorfer | |
| 2003/0019180 A1 | 1/2003 | Warren et al. | |
| 2003/0070368 A1 | 4/2003 | Shingleton | |
| 2003/0094193 A1 | 5/2003 | Mapes et al. | |
| 2003/0097806 A1 | 5/2003 | Brown | |
| 2003/0101662 A1 * | 6/2003 | Ullman | 52/27 |
| 2004/0163338 A1 | 8/2004 | Liebendorfer | |
| 2004/0231274 A1 | 11/2004 | Engstrom | |
| 2005/0072103 A1 | 4/2005 | Hopwood | |
| 2005/0103376 A1 | 5/2005 | Matsushita et al. | |
| 2005/0218657 A1 * | 10/2005 | Weesner et al. | 290/55 |
| 2006/0118163 A1 * | 6/2006 | Plaisted et al. | 136/251 |
| 2006/0156651 A1 | 7/2006 | Genschorek | |
| 2006/0174931 A1 | 8/2006 | Mapes et al. | |
| 2007/0102036 A1 | 5/2007 | Cinnamon | |
| 2007/0151594 A1 | 7/2007 | Mascolo et al. | |
| 2007/0251567 A1 | 11/2007 | Plaisted | |
| 2008/0010915 A1 | 1/2008 | Liebendorfer | |
| 2008/0016818 A1 | 1/2008 | Heirich | |
| 2008/0053517 A1 | 3/2008 | Plaisted et al. | |
| 2008/0087320 A1 | 4/2008 | Mapes et al. | |
| 2008/0172955 A1 | 7/2008 | McClintock et al. | |
| 2008/0264467 A1 | 10/2008 | Doko et al. | |
| 2008/0302407 A1 * | 12/2008 | Kobayashi | 136/251 |
| 2008/0302928 A1 | 12/2008 | Haddock | |
| 2009/0056698 A1 | 3/2009 | Johnson et al. | |
| 2009/0256046 A1 | 10/2009 | Hausner et al. | |
| 2009/0282755 A1 | 11/2009 | Abbott et al. | |
| 2009/0302183 A1 | 12/2009 | Strizki | |
| 2010/0193012 A1 | 8/2010 | Klammer et al. | |
| 2010/0236183 A1 | 9/2010 | Cusson et al. | |
| 2010/0237028 A1 | 9/2010 | Cusson | |
| 2010/0237029 A1 | 9/2010 | Cusson et al. | |
| 2010/0269446 A1 | 10/2010 | Merrifield | |
| 2010/0307991 A1 | 12/2010 | Belikoff et al. | |
| 2011/0072631 A1 | 3/2011 | Hartelius et al. | |

FOREIGN PATENT DOCUMENTS

| | | | |
|---|---|---|---|
| CN | 101095017 A | | 12/2007 |
| CN | 201014798 Y | | 1/2008 |
| CN | 100424305 C | | 10/2008 |
| CN | 101345269 | | 1/2009 |
| CN | 101345269 A | | 1/2009 |
| CN | 201188591 Y | | 1/2009 |
| CN | 101387151 A | | 3/2009 |
| CN | 201256369 Y | | 6/2009 |
| CN | 201435696 | | 3/2010 |
| CN | 201498521 | | 6/2010 |
| CN | 201576689 | | 9/2010 |
| CN | 201757526 | | 3/2011 |
| CN | 101387151 | | 5/2011 |
| EP | 0 993 051 A2 | | 4/2000 |
| EP | 2 211 555 | | 8/2010 |
| EP | 2 339 262 | | 6/2011 |
| JP | 61199671 A | * | 9/1986 |
| JP | 02003534 A | * | 1/1990 |
| JP | 3212629 | | 9/1991 |
| JP | 04146897 A | | 5/1992 |
| JP | 04146897 A | * | 5/1992 |
| WO | WO 97/19291 A1 | | 5/1997 |
| WO | WO 2006/072230 A1 | | 7/2006 |
| WO | WO 2008/124158 | | 10/2008 |
| WO | WO 2008/145903 A1 | | 12/2008 |
| WO | WO 2009/015424 A1 | | 2/2009 |
| WO | WO 2009/146511 | | 12/2009 |
| WO | WO 2010/045514 | | 4/2010 |
| WO | WO 2010/053089 | | 5/2010 |
| WO | WO 2010/057781 | | 5/2010 |
| WO | WO 2010/064656 | | 6/2010 |
| WO | WO 2010/107419 | | 9/2010 |
| WO | WO 2010/107466 | | 9/2010 |
| WO | WO 2010/130720 | | 11/2010 |
| WO | WO 2011/016498 | | 2/2011 |
| WO | WO 2011/023902 | | 3/2011 |
| WO | WO 2011/029758 | | 3/2011 |

OTHER PUBLICATIONS

First Solar, Inc.; FS3X5 Installation Instruction Manual No. SD-2-02104001, Rev. 1 (13 pages) with David Bohling, Engineer CAD drawing (6 pages); website www.firstsolar.com; publication date unknown.

Krannich Solar, Inc. K-2 Systems, Mounting Systems for Solar Technology (7 pages); website http/cms.krannich-solar.com/usa/upload/pdf/K2/image_K2_USA_VIEW.pdfl; publication date unknown.

First Solar Inc.; FS3X5 Installation Instruction Manual No. SD-2-02104001, Rev 1 (13 pages) with David Bohling Engineer CAD drawing (6 pages); website www.firstsolar.com; publication date unknown.

Scheltter Solar Mounting Systems Mounting and project planning, Scheltter Inc., Manual [online], Mar. 10, 2010 [retrieved on Oct. 31, 2011]. Retrieved from the internet: URL:http://www.schletter.us/support/Mounting%20and%20proj.

* cited by examiner

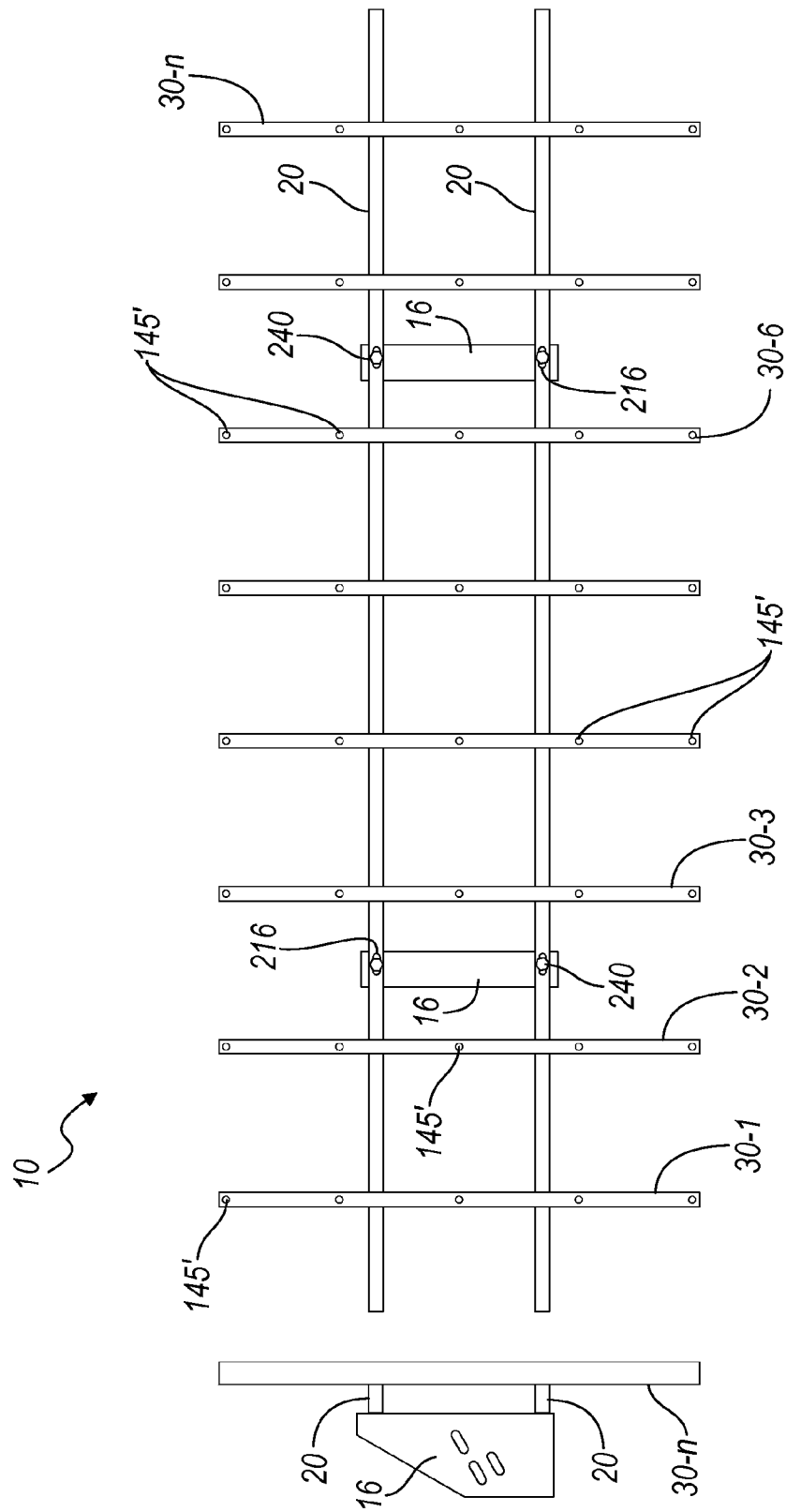

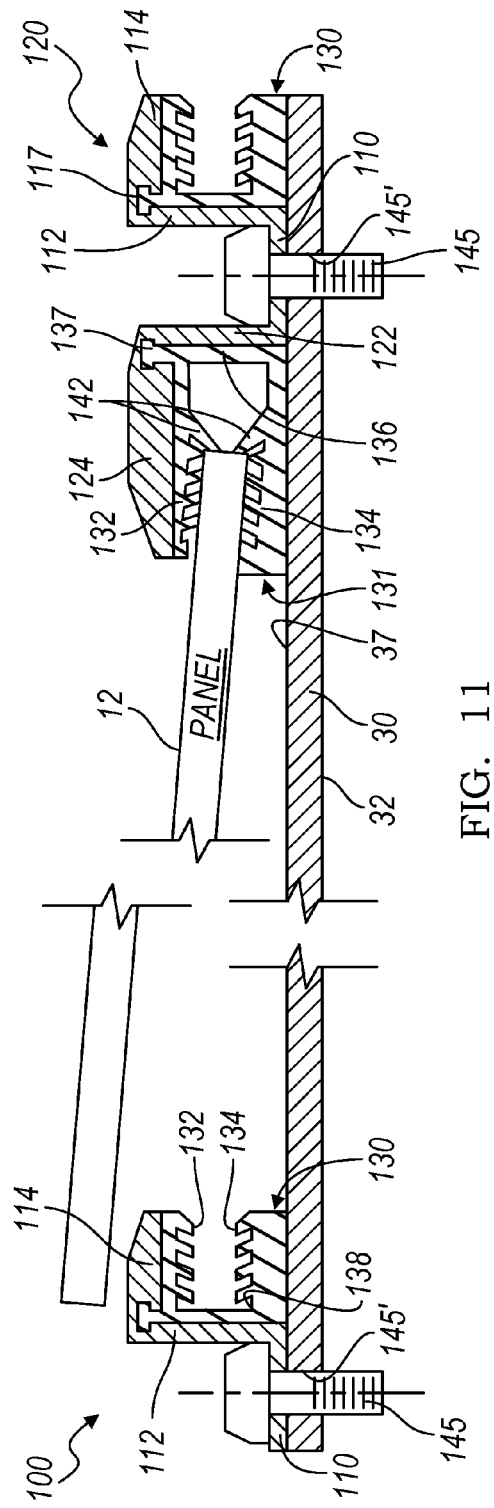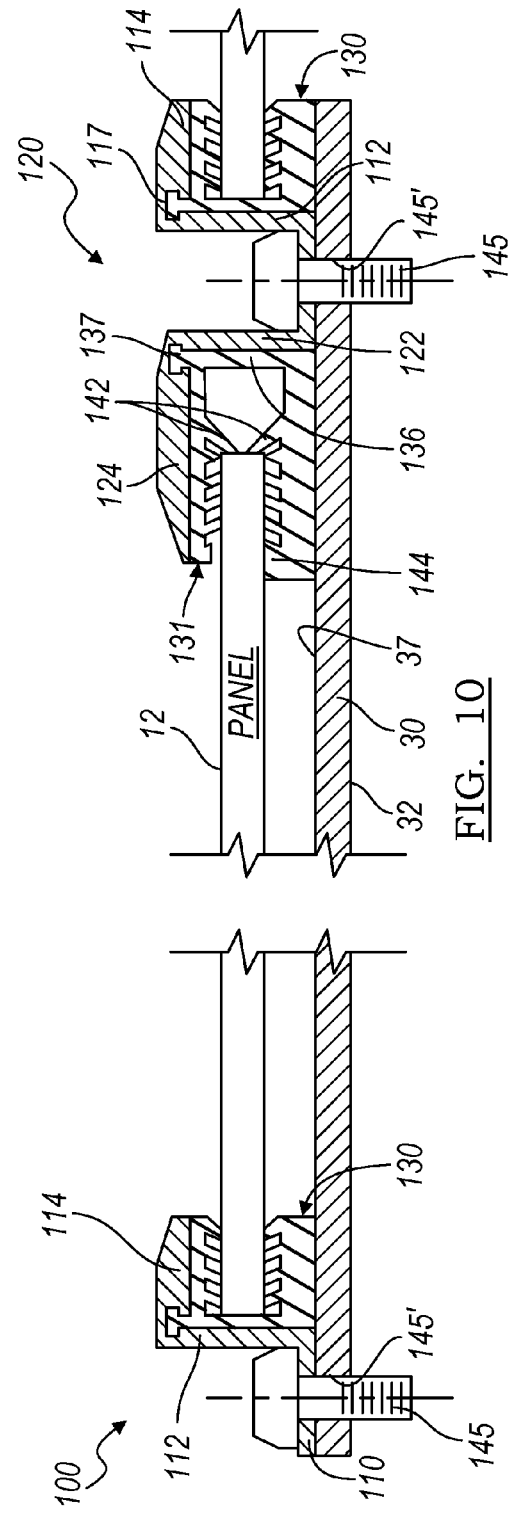
FIG. 11
FIG. 10

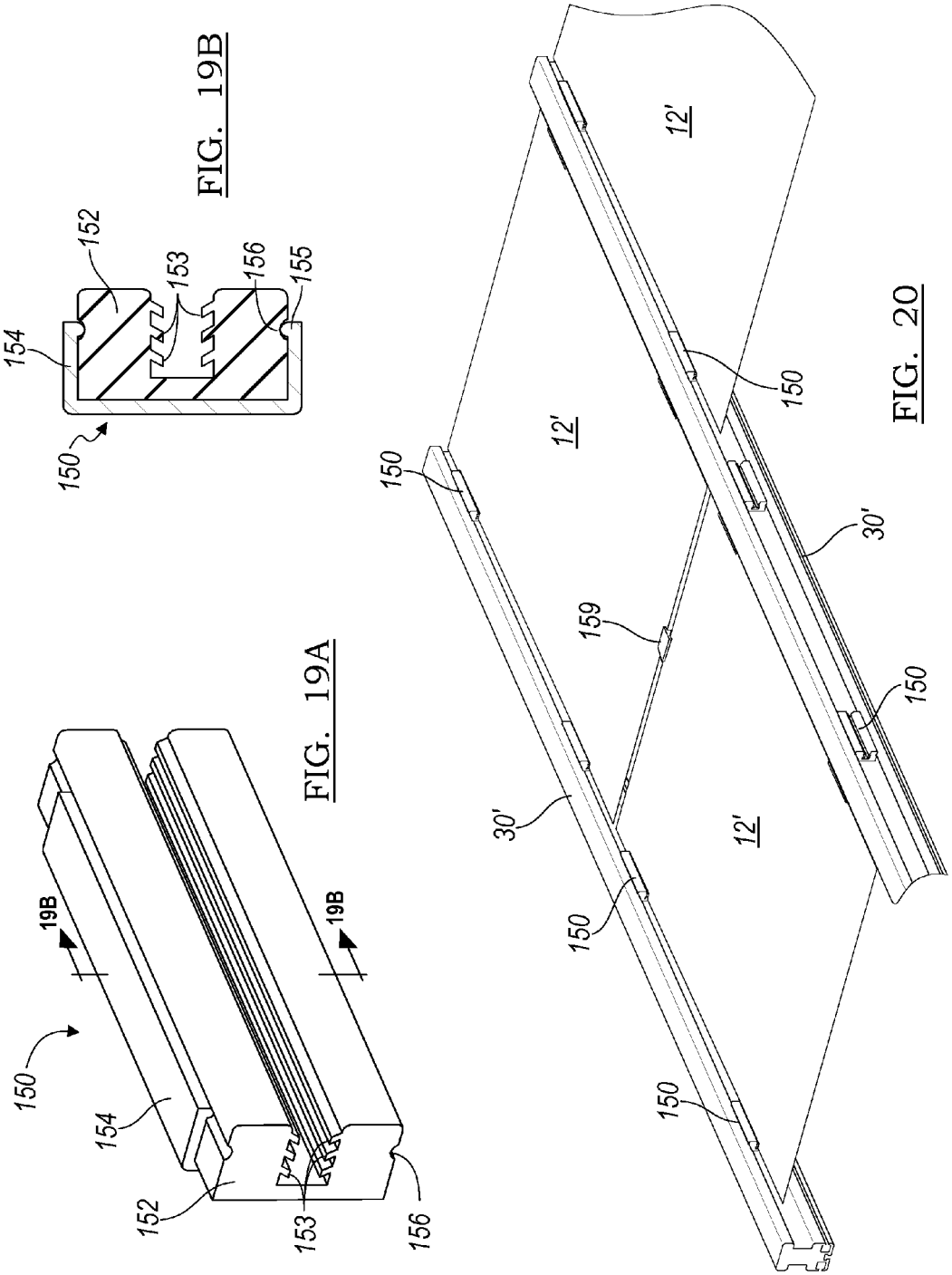

US 8,240,109 B2

SUPPORT SYSTEM FOR SOLAR PANELS

PRIORITY INFORMATION

The present invention claims priority to U.S. patent application Ser. No. 12/383,240 filed on Mar. 20, 2009, and makes reference herein to same in its entirety.

FIELD OF THE INVENTION

This invention relates to a solar energy collection system, and more particularly to a support system for an array of photovoltaic panels and method of assembling the same. The invention includes a bi-directional span of support members, including a profiled support rail having a longitudinal T-slot channel adapted to receive the head of a bolt for adjustable attachment to a support joist. A variety of panel-holding devices, such as friction clips, may also be used.

BACKGROUND OF THE INVENTION

A standard photovoltaic panel array includes a plurality of solar panels optimally arranged for converting light incident upon the panels to electricity. Various support systems are used for attachment to roofs, free-field ground racks or tracking units. Typically, these support systems are costly, labor intensive to install, heavy, structurally inferior and mechanically complicated. For example, a support system generally includes off-the-shelf metal framing channels having a C-shaped cross-section, such as those sold under the trademarks UNISTRUT™ or BLIME™, improvised for use as vertical and horizontal support members. The photovoltaic panels are directly secured to the support members and held in place by clips. The clips serve as hold-down devices to secure the panel against the corresponding top support member in spaced-relationship. The clips are positioned and attached about the panel edges once each panel is arranged in place.

For a free-field ground rack system as shown in FIG. 1, support elements, such as I-beams, are spaced and securely embedded vertically in the ground. Tilt brackets are installed at the top of each I-beam, and each tilt bracket is secured to the I-beam such that a tilt bracket flange extends above the I-beam at an angle as best seen in FIG. 2A. As shown in this case, two UNISTRUT™ joists span the tilt brackets and are secured thereto. As seen in FIG. 2B, UNISTRUT™ rails are positioned across and fastened to the horizontal joists. To secure each rail to the corresponding horizontal joists, a bolt through a bolt hole made in the rail sidewall attaches to a threaded opening in a transverse nut-like plate slideably mounted inside the channel of the UNISTRUT™ joist, so that the nut-like plate engages and tightly secures against the upper flange of the joist's C-channel as seen in FIG. 2A. Importantly, the width of the plate is slightly less than the width of the channel, so that the plate can be slideably adjusted in the channel, without the plate rotating therein.

Once the bi-directional span is assembled, each solar panel is positioned and top and bottom clips are secured to each rail about the perimeter of each panel, to hold the panel such that the center of each panel is between two rails.

Another example of a support system is shown in U.S. Pat. No. 5,762,720, issued to Hanoka et al., which describes various mounting brackets used with a UNISTRUT™ channel. Notably, the Hanoka et al. patent uses a solar cell module having an integral mounting structure, i.e. a mounting bracket bonded directly to a surface of the backskin layer of a laminated solar cell module, which is then secured to the channel bracket by bolt or slidably engaging C-shaped members.

Other examples are shown in U.S. Pat. No. 6,617,507, issued to Mapes et al., U.S. Pat. No. 6,370,828, issued to Genschorek, U.S. Pat. No. 4,966,631, issued to Matlin et al., and U.S. Pat. No. 7,012,188, issued to Erling.

Notably, existing support systems require meticulous on-site assembly of multiple parts, performed by expensive field labor. Assembly is often performed in unfavorable working conditions, i.e. in harsh weather and over difficult terrain, without the benefit of quality control safeguards and precision tooling. Misalignment of the overall support assembly often occurs. This can jeopardize the supported solar panels, or other supported devices.

For example, spacing of the photovoltaic panels is important to accommodate expansion and contraction due to the change of the weather. It is important, therefore, that the panels are properly spaced for maximum use of the bi-directional area of the span. Different spacing may be required on account of different temperature swings within various geographical areas. It is difficult, however, to precisely space the panels on-site using existing support structures without advanced technical assistance. For example, with the existing design described above (with reference to FIGS. 2A and 2B), until the rails are tightly secured to the horizontal joist, each rail is free to slide along the horizontal joists and, therefore, will need to be properly spaced and secured once mounted on-site. Further, since the distance between the two horizontal joists is fixed on account of the drilled bolt holes through the rails, it is preferred to drill the holes on-site, so that the horizontal joists can be aligned to attach through the pre-drilled attachment holes of the tilt bracket. Unfortunately, the operation of drilling the holes on-site requires skilled workers, and even with skilled installation, might still result in misalignment of the support structure and/or the solar panels supported by that structure.

Therefore, a need exists, for a low-cost, uncomplicated, structurally strong support system and assembly method, so as to optimally position and easily attach the plurality of photovoltaic panels, while meeting architectural and engineering requirements.

To accomplish the foregoing and related objectives, an improved support system would achieve a precise configuration in the field without extensive work at the installation site. The use of such an improved system would facilitate easy placement of solar panels onto the support structure. Further, a variety of different panel clips or holders could be used within the overall concept of the system. The shipping configuration of the improved support system would be such so as to be easily handled in transit while still facilitating rapid deployment. At present, none of the conventional art offers these capabilities.

SUMMARY OF THE INVENTION

It is a primary object of the present invention to improve upon conventional photovoltaic solar panel systems, especially with regard to assembly and installation.

It is another object of the present invention to provide a support and installation system for solar panels in which the panels are less likely to be damaged during installation.

It is a further object of the present invention to provide a support system for solar panels that is easily installed on-site while still resulting in a precise configuration for purposes of mounting the solar panels.

It is an additional object of the present invention to provide a solar panel support system that can be assembled very quickly on site.

It is still another object of the present invention to provide a solar panel support system that can achieve close tolerances during field installation without the necessity of skilled labor at installation.

It is again a further object of the present invention to provide a solar panel support system in which specialized mounting brackets bonded to the solar panels are not necessary for the mounting of the solar panels to the support system.

It is still an additional object of the present invention to provide a solar panel support system which can be easily adapted to a wide variety of solar panel array sizes and shapes.

It is yet another object of the present invention to provide a solar panel support system which minimizes the necessity for precise measurements at the installation site.

It is again a further object of the present invention to provide a solar panel support system that can be arranged at a variety of different positions and exposure angles.

It is still an additional object of the present invention to provide a solar panel support system that can be precisely configured to a specific environment.

It is another object of the present invention to provide a support system for solar panels and other panel-like structures in which degradation caused by metal-to-metal contact is substantially reduced.

It is again another object of the present invention to provide a support system for panel-like structures in which accommodation is made for movement caused by changes in temperatures, humidity or other environmental considerations.

These and other goals and objects of the present invention are accomplished by a method of assembling a support structure constituted by a bi-directional array of structural members installed in a configuration of substantially perpendicular upper and lower structural members. The method includes the steps of identifying characteristics of the installed configuration of the support structure, including relevant measurements of the support structure with respect to the installation site. Then the support structure is assembled in accordance with the characteristics of the installed configuration at a staging site. Once properly assembled, the support structure is collapsed into an interconnected package appropriate for transport. After transport to the installation site, the support structure is installed according to the predetermined characteristics of the configuration as it is to be installed at the installation site.

In another embodiment of the present invention, the stated objects and goals of the invention are achieved by a collapsible support system, constituted by an intersecting array of structural members including a first group of lower support joists and a second group of upper support rails. These structural members are held together by adjustable connectors that facilitate rotation of the support joist and the upper support rails. Also, with this system a plurality of unique holding clips may be used to easily receive and hold each solar panel by the collapsible support structure when the collapsible structure is in its assembled and installed state.

DESCRIPTION OF THE DRAWINGS

Having generally described the nature of the invention, reference will now be made to the accompanying drawings used to illustrate and describe the preferred embodiments thereof. Further, the aforementioned advantages and others will become apparent to those skilled in this art from the following detailed description of the preferred embodiments when considered in light of these drawings, in which:

FIG. 4A is a top plan view of the bi-directional span of the assembly of the instant invention in the open position showing vertically-aligned upper support rails attached atop horizontally-aligned support joists;

FIG. 4B is an end elevational view of the bi-directional span of the assembly shown in FIG. 4A;

FIG. 10 is a sectional elevation view showing a solar panel mounted between a two-panel clip and a single-panel clip;

FIG. 11 is a sectional elevation view showing a panel being fitted within a gasket of the two-panel clip and arranged to be fitted into a single-panel clip gasket;

FIGS. 19A and 19B are perspective and cross-sectional views, respectively, of a panel-framing clip used with unframed panels; and FIG. 20 is a partial perspective view of the support system of the instant invention depicting unframed solar panels arranged in a column and in spaced relationship thereon, wherein the support system has longituding, I-shaped tubular upper support rails.

DESCRIPTION OF THE PREFERRED EMBODIMENT

Figure 1:
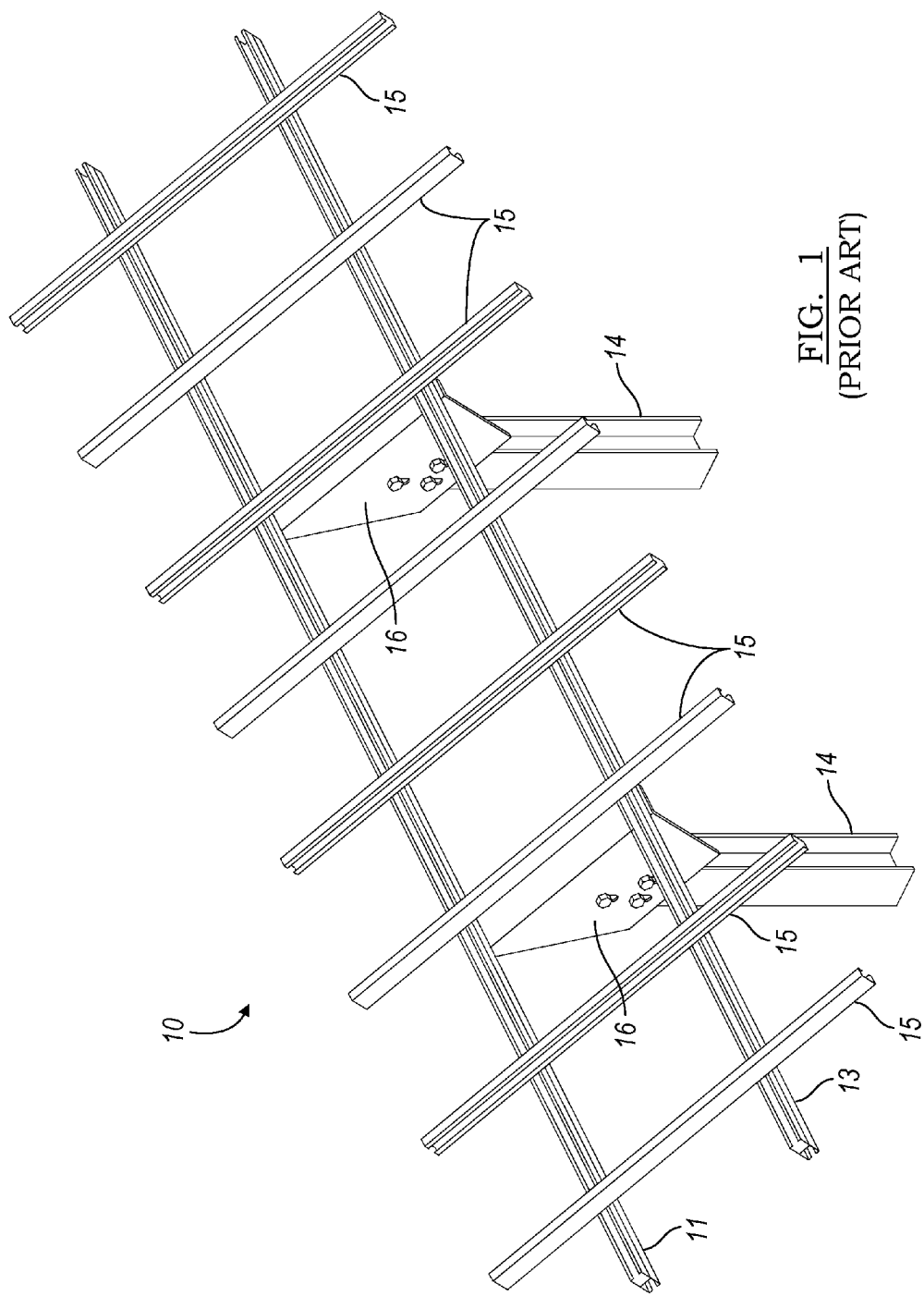
FIG. 1 is a perspective view of an assembled conventional field ground rack support system for securing a plurality of solar panels.

With reference to the drawings, a support system for a photovoltaic array of framed or unframed solar panels 12, 12', respectively, known in the prior art includes a free ground rack structure having spaced vertical support elements 14 extending from the ground. The support system 10 of FIG. 1 shows only two vertical support elements 14, although multiple support elements may be used to accommodate a longer array of solar panels. Notably, the support system can also be mounted to a roof (or other structure), or tracking unit. Each of the support elements 14 for the free-field ground rack is preferably an I-beam securely embedded and vertically aligned in the ground, as is well known in the art.

Conventionally, a pair of lower horizontally-aligned, C-shaped support joists 11, 13 is mounted at the upper ends of the support elements 14 by tilt bracket mounts 16. Thus, the vertical support elements 14 are spanned by the support joists 11, 13. When there are additional arrays with additional support elements 14, they can be spanned by multiple joists attached at their ends, or the joists 11, 13 can be longitudinally extended to span all of the support elements 14 in one, unbroken length.

Figure 2:
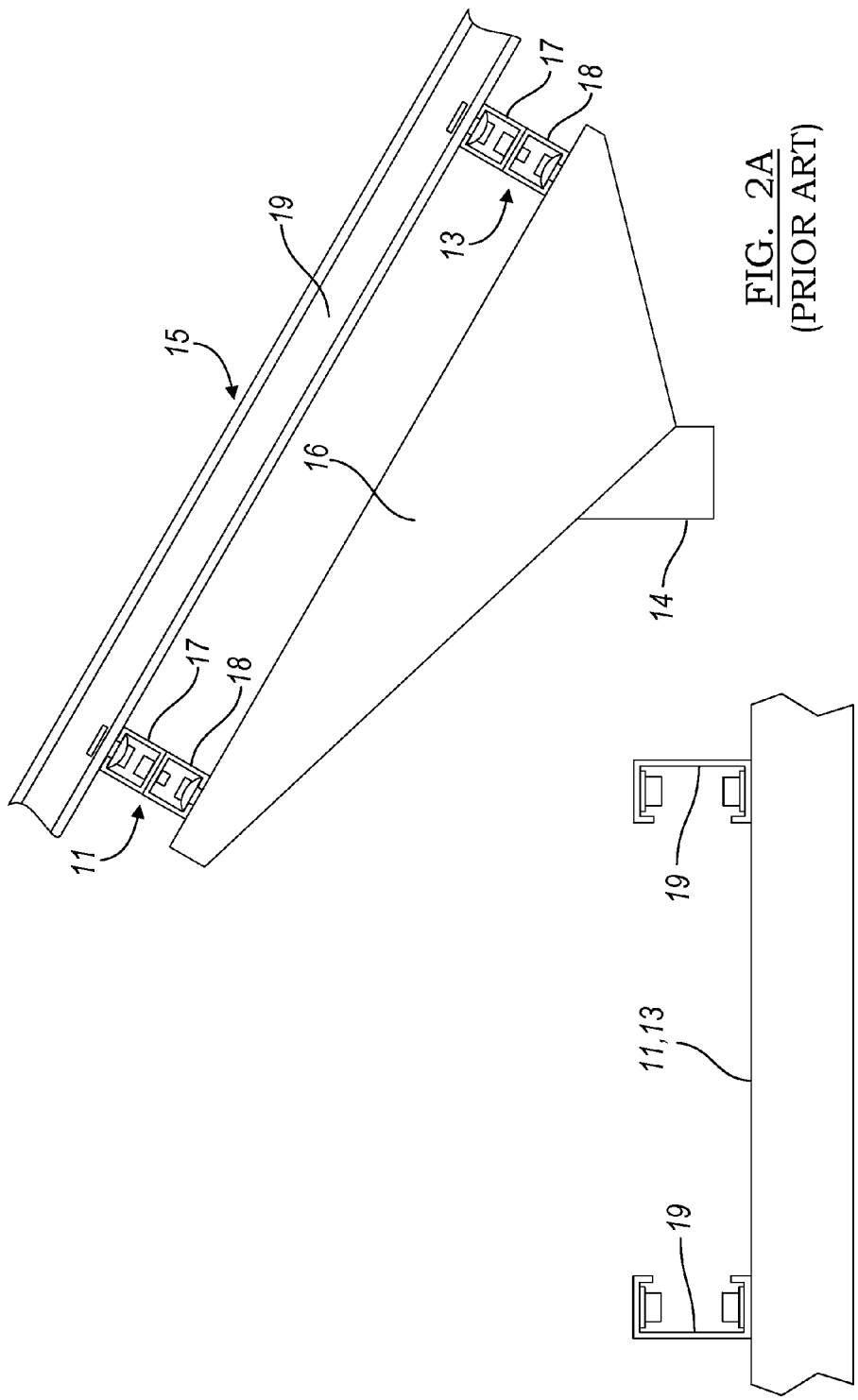
FIG. 2A is a side view of a conventional tilt bracket mount with prior art C-shaped sectional channels secured back-to-back to form support joists to which upper support rails, also shown in FIG. 2B, are secured.
FIG. 2B shows an end view of prior art upper support rails, each with a C-shaped sectional channel.

Upper vertically-aligned rails 15, arranged perpendicular to the support joists 11, 13, are secured to the support joists to produce a two-dimensional span, on which the panels or other panel-like structures are supported. FIG. 2A illustrates conventional support joists 11, 13 secured to tilt bracket mounts 16 by back-to-back channels 17, 18, with each channel having a C-shaped cross-section. Similarly, each conventional upper rail 15 is secured to the lower support joists 11, 13 by bolts through a corresponding wall of its C-channel 19, as best seen in FIG. 2B.

Figure 3:
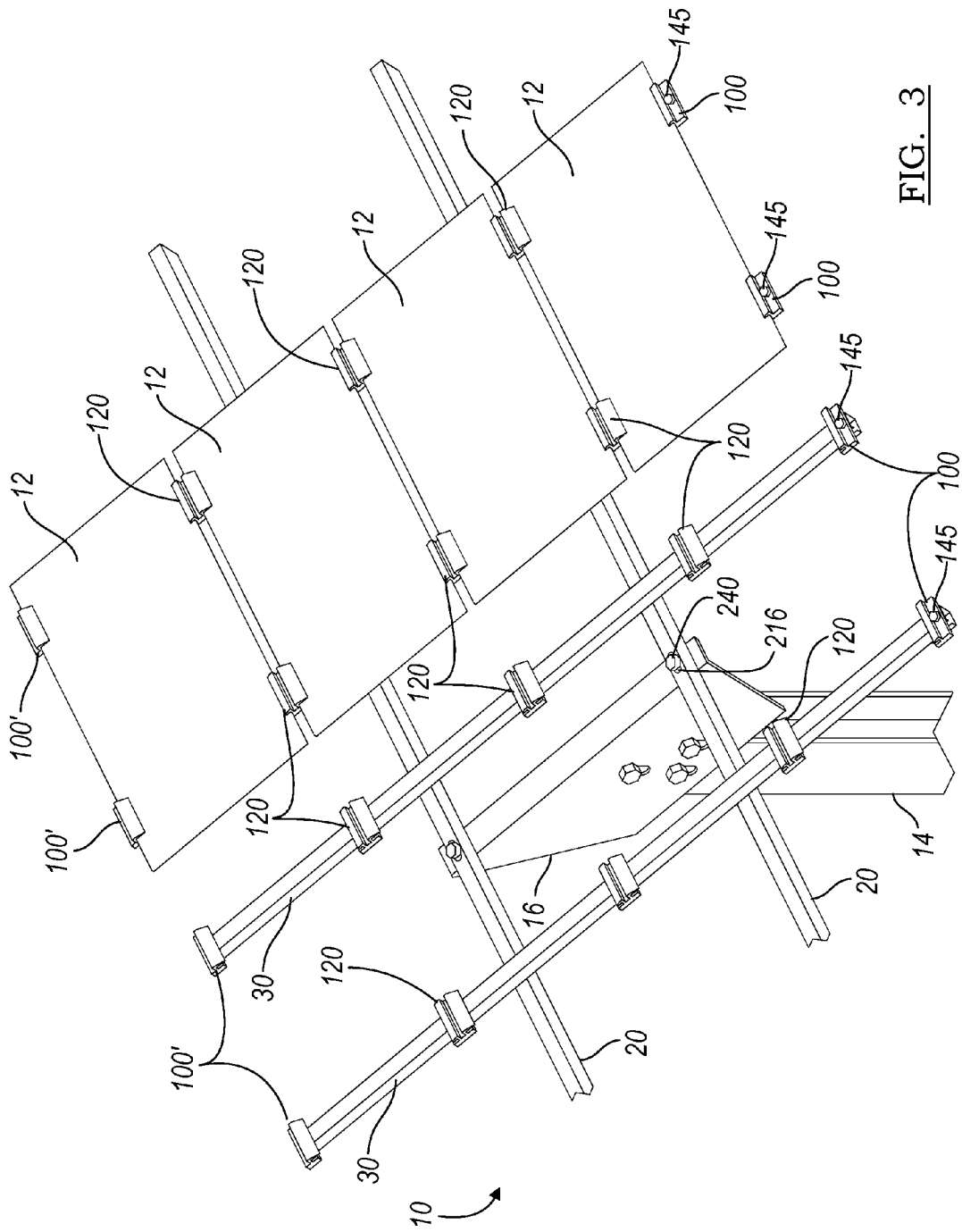
FIG. 3 is a perspective view of a support system of the instant invention showing solar panels arranged in a column and in spaced relationship thereon wherein the support system has horizontally-aligned support joists and (relative thereto) vertically-aligned upper support rails.

In accordance with one preferred embodiment of this invention, FIG. 3 depicts a support system 10 for a photovoltaic array of solar panels 12, attached to the same, conventional vertical support elements 14. The support system 10 in this case, however, includes a bi-directional span of horizontally-aligned lower support joists 20 and vertically-aligned upper support rails 30-1 through 30-n, as also seen in FIGS. 4A and 4B.

Before proceeding with the description herein, for purposes of fully appreciating the present disclosure of the instant invention, the terminology "horizontally-aligned" refers to structural members that appear to be parallel to the horizon. "Vertically-aligned" structural members are perpendicular to the "horizontally-aligned" structural members. However, because the present invention can be mounted on almost any structural support, the terms "horizontally-aligned" and "vertically-aligned" may become inappropriate for certain situations. Accordingly, alternative terminology such as, "longitudinally extending" or "laterally extending" can be used instead. For example, in FIG. 3, the "horizontally-aligned" structural members are also extended longitudinally while the "vertically-aligned" members extend in a lateral direction. These various terminologies are used as a matter of convenience, and for purposes of example only.

Figures 13A, 13B:
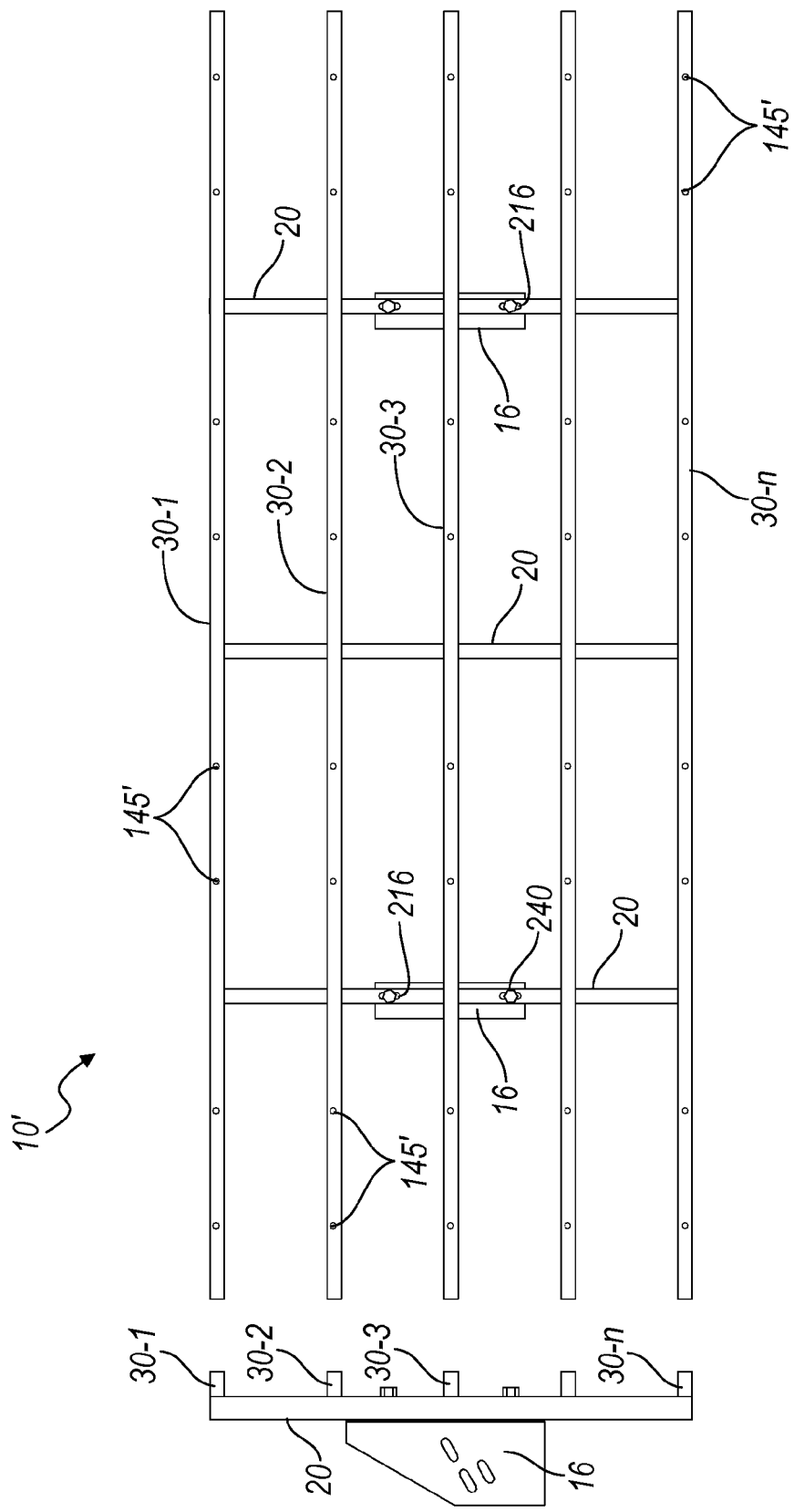
FIG. 13A is a top plan view of the bi-directional span of the assembly of the instant invention in the open position showing upper support rails attached atop support joists.
FIG. 13B is an end elevational view of the bi-directional span of the assembly shown in FIG. 13A.
Figure 16:
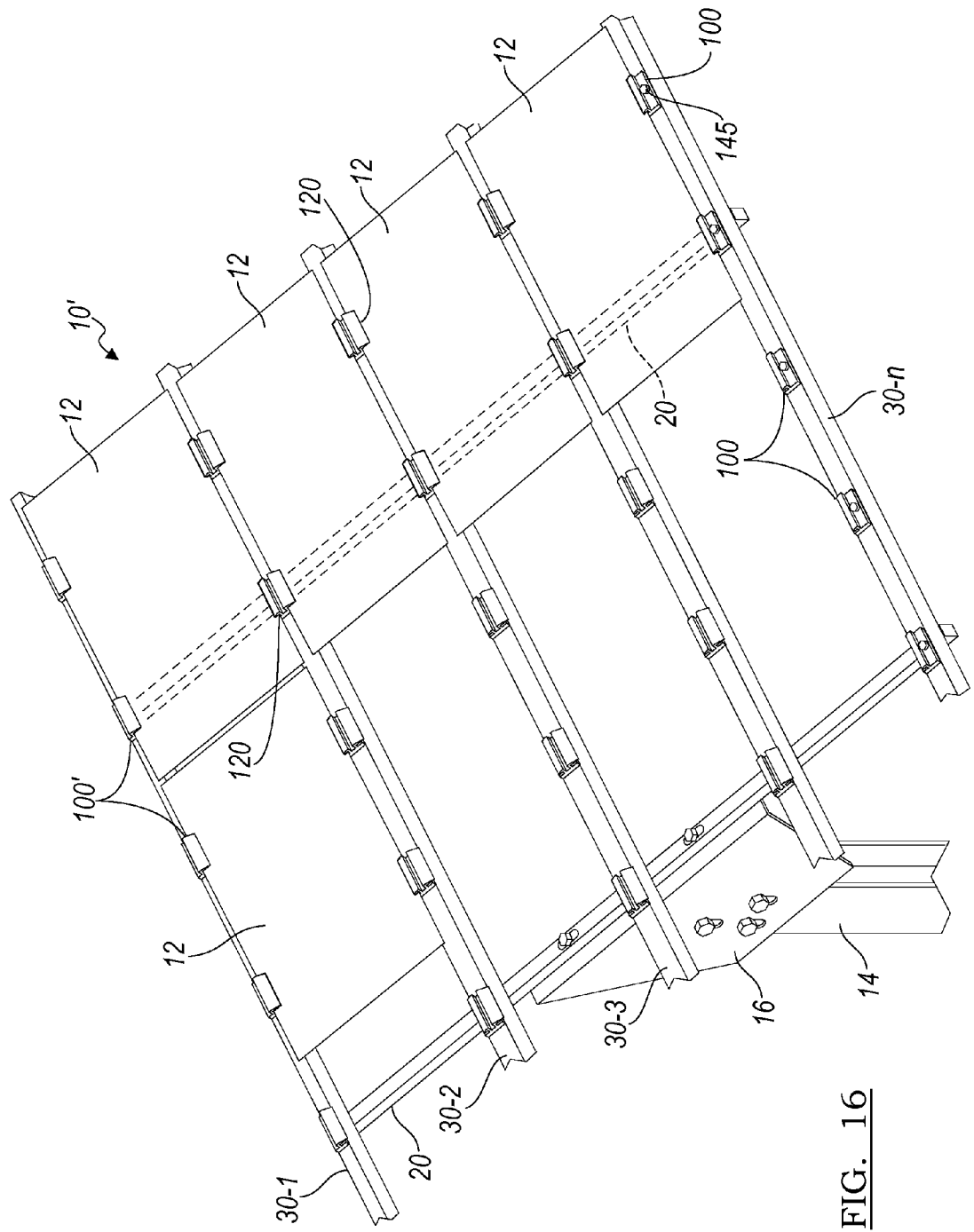
FIG. 16 is a perspective view of the support system similar to FIG. 3, but in this case using vertically-aligned support joists and horizontally-aligned support rails.

As an alternative or second embodiment to that described above, the bi-directional span can have the lower support joists 20 to align along the length of tilting support brackets 16. As a result upper support rails 30-1 through 30-n extended longitudinally, as seen in FIGS. 13A, 13B and 16. It should be understood that within the context of the present invention, either orientation in any configuration of the substantially perpendicular structural elements (lower support joist 20 and upper support rails 30) can be used. Further, a wide variety of different shapes, sizes and configurations is encompassed by the concept of the present invention and is not to be limited by the examples provided herein. The present invention can be adjusted to conform to any support structure or any "footprint" available for the deployment of solar panels, or any other, panel-like structure to be supported by the present invention.

Figure 9:
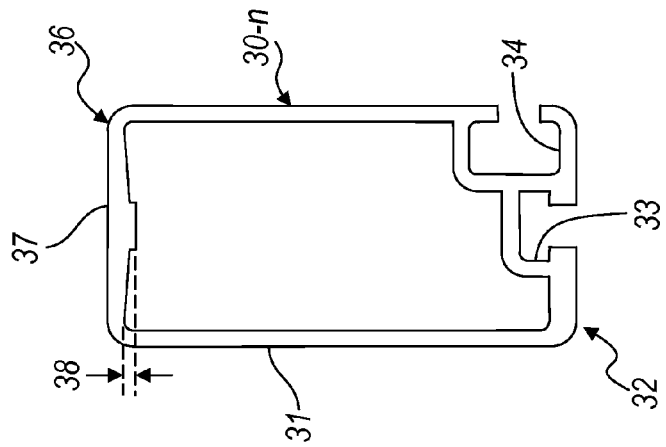
FIG. 9 is an end view of the upper support rail of FIG. 8.
Figure 8:
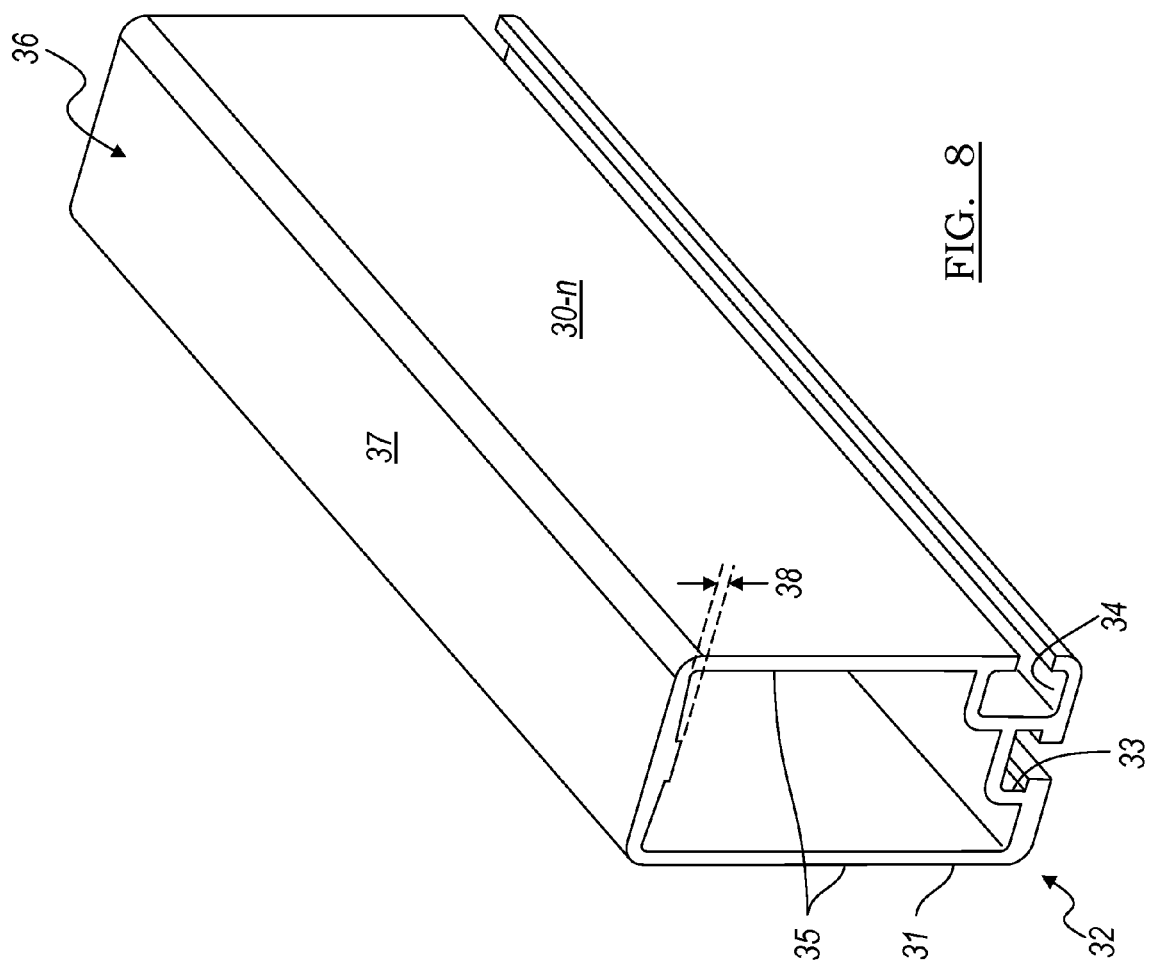
FIG. 8 is a cross-sectional perspective view of an upper support rail.

Preferably, each upper support rail 30-n in this design is a hollow aluminum extrusion. However, in the alternative, the upper support rail may be made of roll-formed steel. Preferably, each support rail 30-n has a tubular body 31 having a generally rectangular cross-section with an upper wall section 36 and lower wall section 32 defined between spaced side walls 35 as best seen in FIGS. 8 and 9. The upper wall section 36 has a flat top surface 37 and upper wall of varied thickness, preferably having its thickest portion 38 in the center. This thicker center portion 38 is for added strength when fastening the single-panel clips 100, 100' and two-panel clip 120 (described below). Strength can also be achieved for each support rail 30-n using a thicker lower wall section 32. The lower wall section 32 includes a longitudinal T-slot sectional channel 33 and, preferably, a longitudinal C-slot sectional channel 34.

Figure 18B:
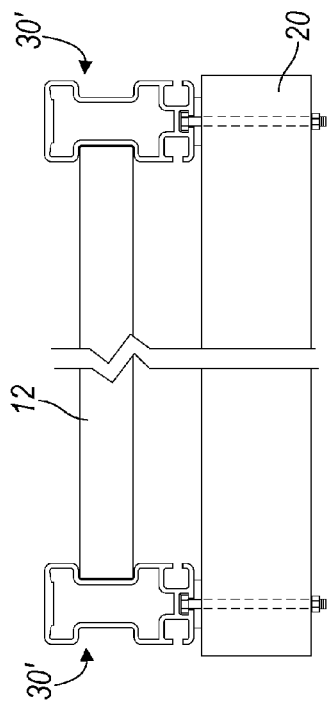
FIGS. 18B and 18C are partial sectional views showing a framed and unframed panel, respectively, fitted within pockets of adjacently spaced I-shaped tubular upper support rails.
Figure 18C:
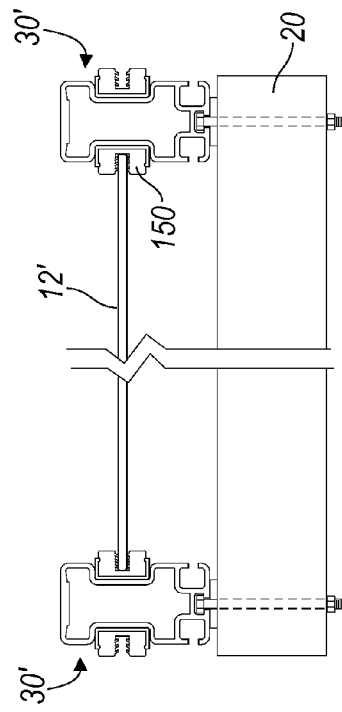
Figure 18A:
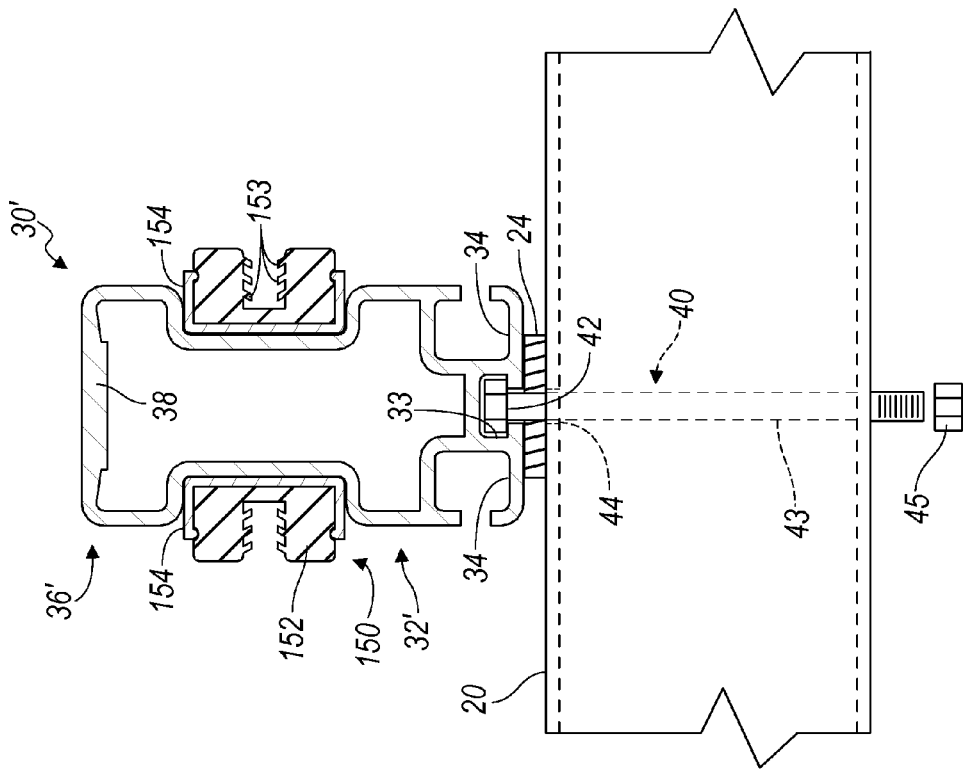
FIG. 18A is a cross-section of the second embodiment of the upper support rail with panel framing clips.

For additional strength and/or flexibility, an alternative (i.e. second) profile of the support rail 30'-n shown in FIGS. 17, 18A, 18B and 18C can be used. This profile has an I-shaped cross-sectional tubular body 31' with a flanged upper wall section 36' and a flanged lower wall section 32' forming a pocket 39 therebetween. More specifically, spaced side walls 35' form pockets 39 with the flanged upper and lower wall sections 36', 32', respectively. Like the preferred upper support rail design described above, i.e. rail 30-n, the upper wall section 36' of the alternative design has a flat top surface 37 and upper wall of varied thickness, preferably having its thickest portion 38 in the center. The lower wall section 32' includes a longitudinal T-slot sectional channel 33 between two longitudinal C-slot sectional channels 34; one on each side of the T-slot channel. The dual C-slot sectional channels 34 in the second support rail 30'-n allows for easier assembly, in that wires can be tucked away on either side of the rail. Notably, the pockets 39 may be used to eliminate clips 100, 100', and/or 120 (described in detail below), i.e. to secure individual solar panels 12 (framed) or 12' (unframed) by sliding the panels therein between adjacent rails 30', as best seen in FIGS. 18B, 18C and 20.

Pockets 39 (and any clips or gaskets held therein) are especially important in that they can be configured to allow the panel (whether framed or unframed) to move therethrough along the length. This capability allows panels or panel-like structures to be slid along the lengths of the upper support rails 30, thereby facilitating a quick and accurate installation of the panels supported by the inventive structural support system. The quick and accurate installation of the solar panels is one of the byproducts, and is a benefit coextensive with those of the present invention. With the present invention, accuracy is not sacrificed for ease of installation.

Figure 7:
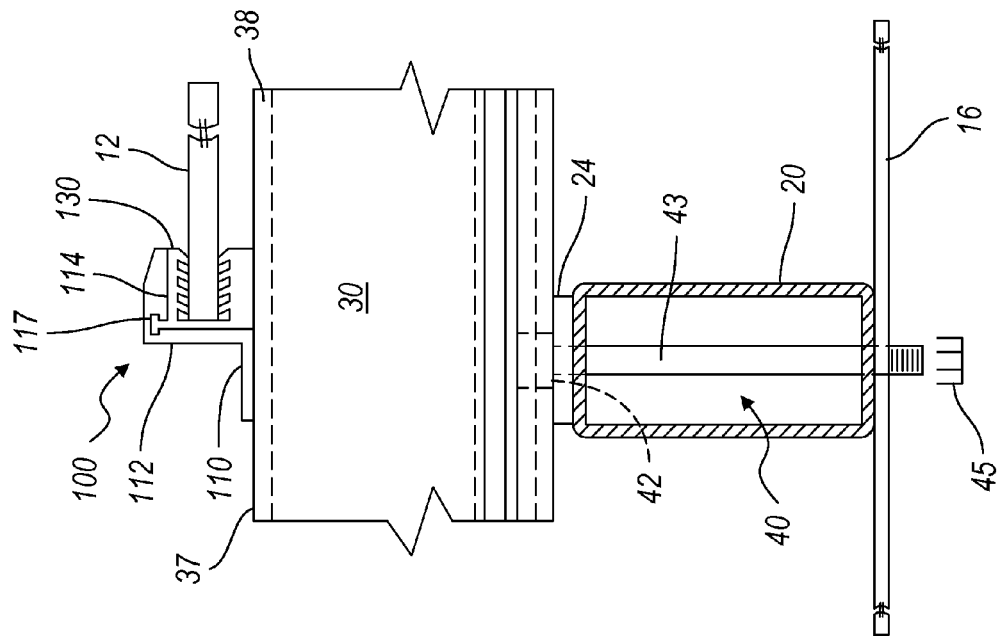
FIG. 7 is an end elevation and partial sectional view perpendicular to that shown in FIG. 6.
Figure 6:
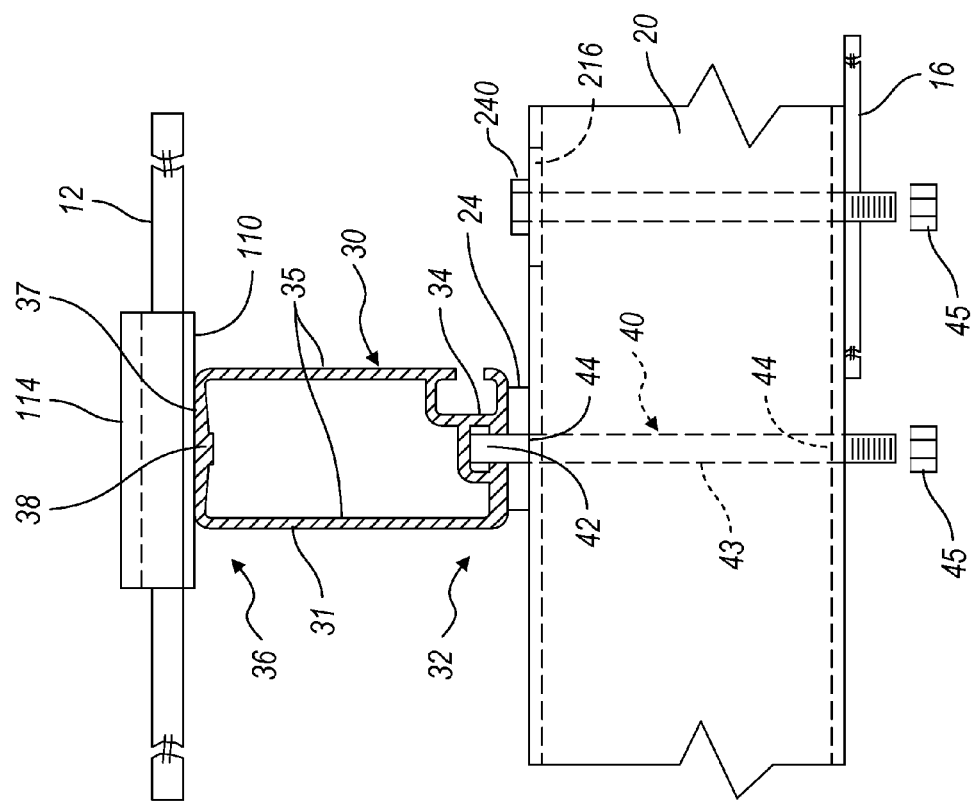
FIG. 6 is a side elevation and partial sectional view that depicts a support joist and a tubular upper support rail with a single-panel clip.
Figure 15:
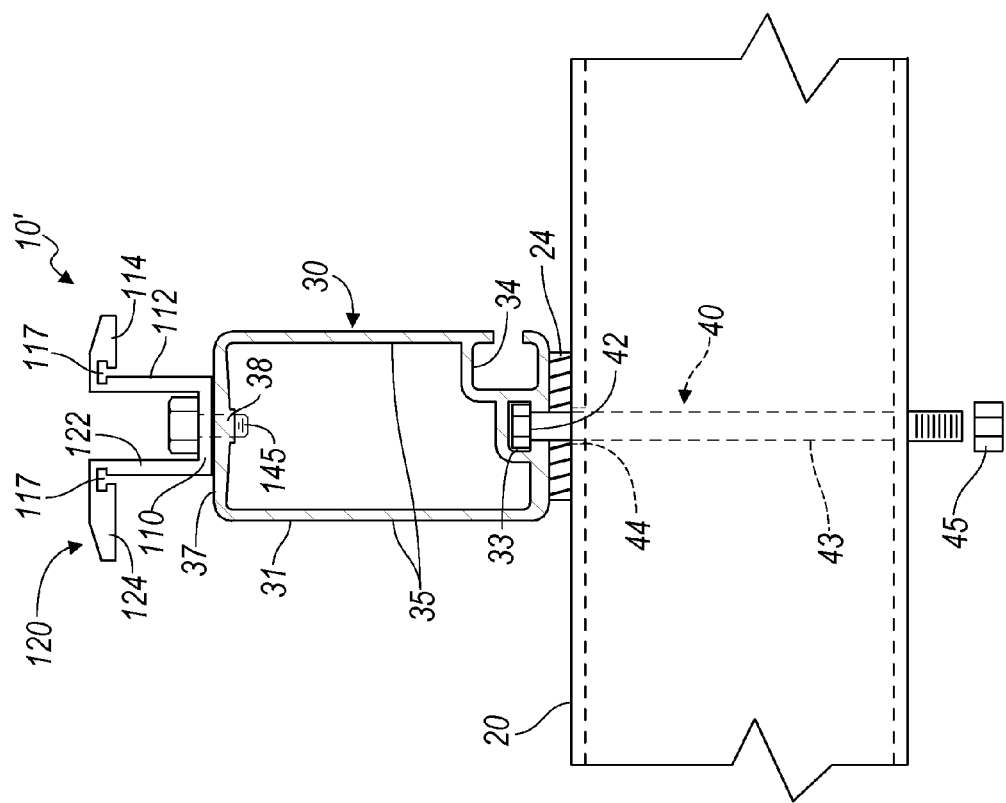
FIG. 15 is a side elevation and partial sectional view that shows a support joist and a tubular upper support rail with a two-panel clip.

Referring again to the preferred embodiment, the spacing between each upper support rail 30 or 30' is governed by the height of the individual solar panels 12, 12' and the number of solar panels per column. Regarding the alternative rail and joist configuration shown in FIGS. 13A and 16, the spacing between each upper support rail 30 or 30' is governed by the width of the individual solar panels 12, and the number of solar panels per row. Each upper support rail 30-1 through 30-*n* or 30'-1 through 30'-n, as the case may be, is attached to the lower support joists 20 by bolts 40, wherein the head 42 of each bolt is slidably accommodated in the corresponding T-slot channel 33 of the respective upper support rail. As best seen in FIGS. 6, 7 and 15, the shank 43 of the bolt 40 passes through and is secured to the respective support joist 20 using a nut 45 or other type fastener to form the bi-directional span.

Figure 5A:
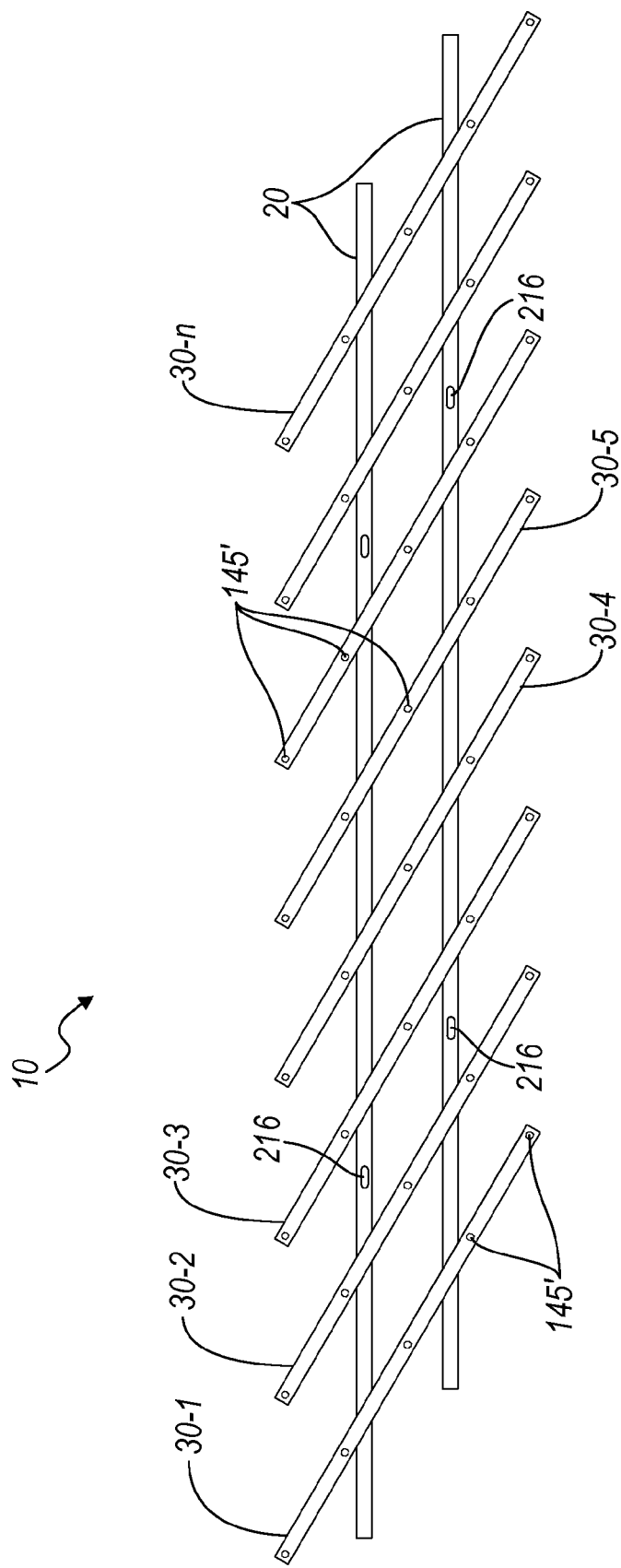
FIG. 5A is a top plan view illustrating the bi-directional span of the assembly shown in FIG. 4A in the folded position.
Figure 5C:
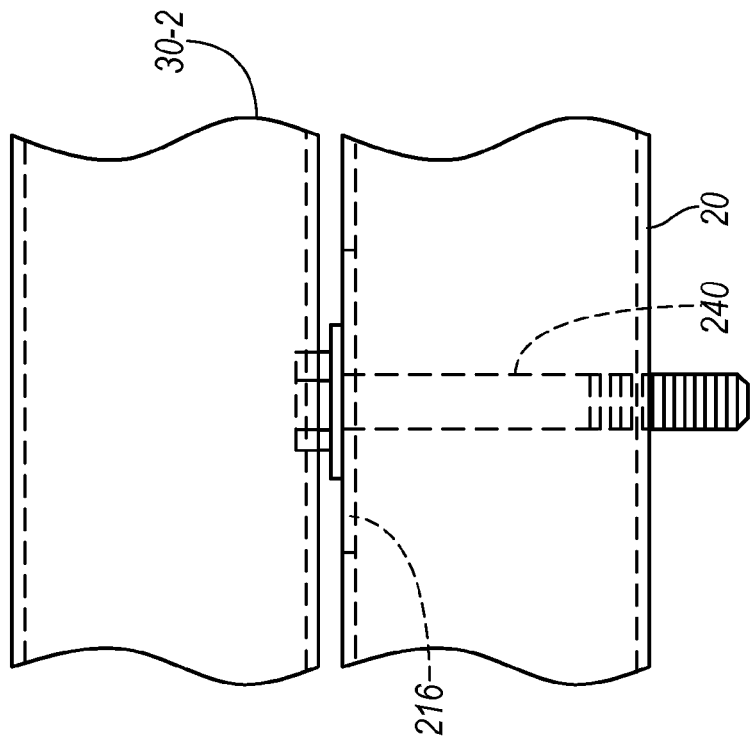
FIG. 5C is a side view of FIG. 5B depicting the connector for holding the support joist to the support and/or tilt bracket or similar structure.
Figure 5B:
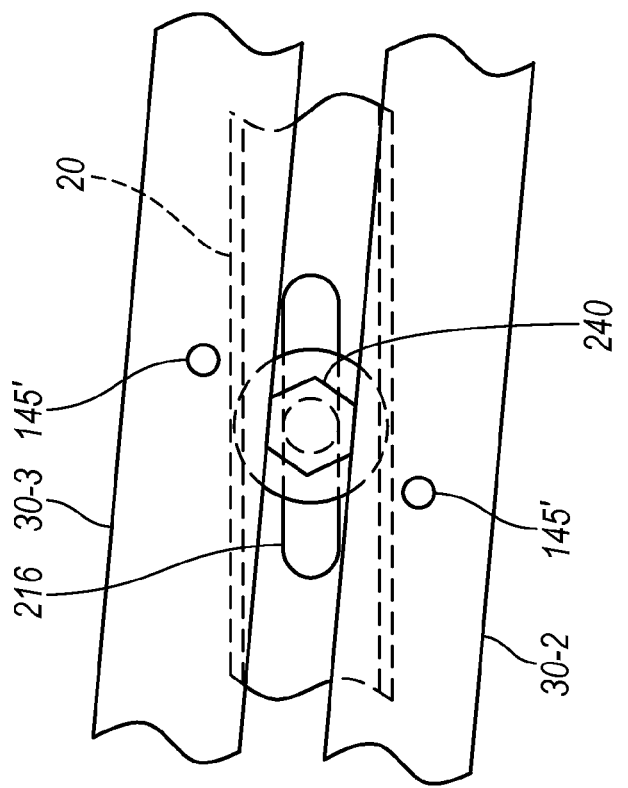
FIG. 5B shows in enlarged detail the support system of the instant invention in a collapsed or folded position, and depicting, in particular, a connector for holding the support joist to a support and/or tilt bracket or similar structure held, i.e. pinched between adjacent support rails.
Figure 14:
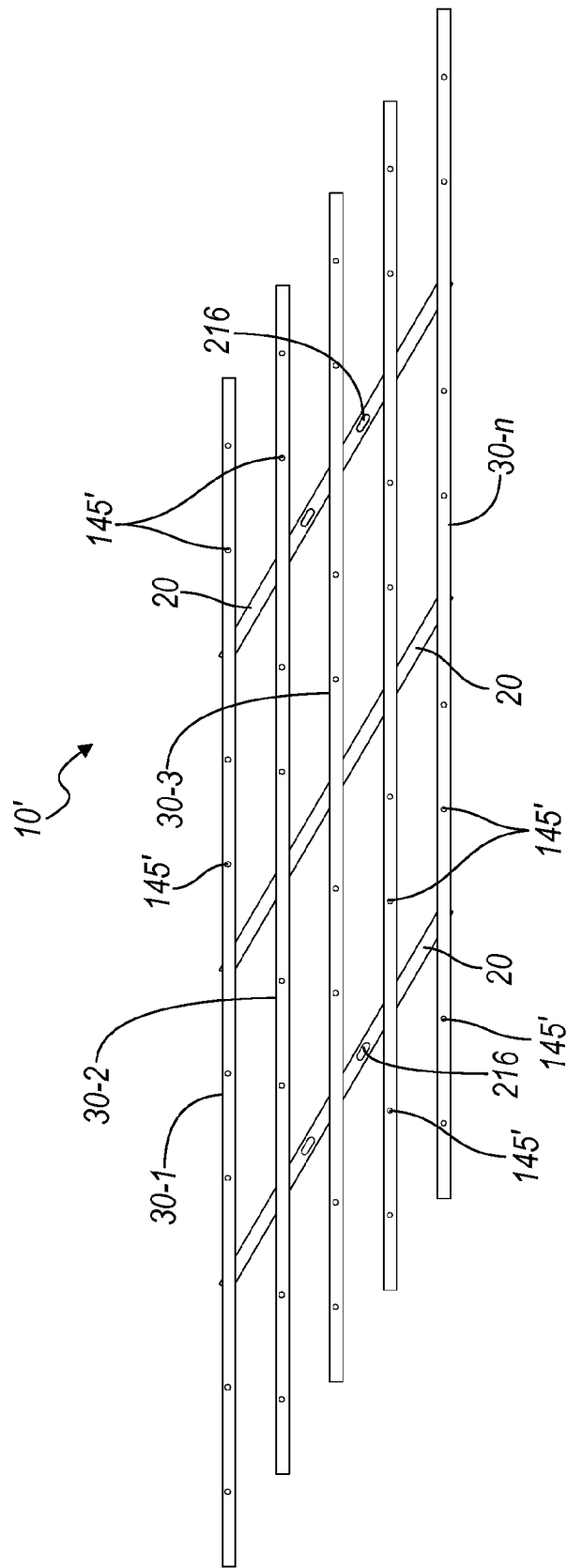
FIG. 14 is a top plan view illustrating the bi-directional span of the assembly shown in FIG. 13A in the folded position.
Figure 17:
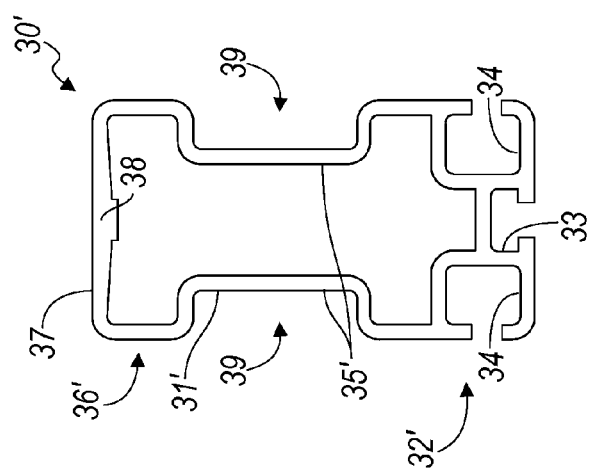
FIG. 17 is an end view of the a second embodiment of an I-shaped tubular upper support rail.

Notably, with the nuts 45 and bolts 40 tightened below a predetermined torque value, the bi-directional span can be easily folded to reduce space for shipping, as shown in FIGS. 5B and 14. Each support joist 20 is separated from the corresponding upper support rail 30-*n* or 30'-n by nonconductive separation washers 24, preferably made of nylon, in order to prevent galvanic interaction between unlike materials. The nylon washer 24 is preferably about $\frac{1}{8}^{th}$ inch thick, although other materials and thicknesses may be used. The use of the nylon washer 24 at the intersection of support joist 20 and a corresponding upper support rail 30 facilitates the rotation of these two elements with respect to each other. Rotation is further facilitated if the nut 45 includes a nylon insert. The nylon insert helps to prevent the nut 45 from loosening during folding and unfolding of the bi-directional span.

Regarding FIGS. 6, 7 and 15, it is important to notice the small differences between FIGS. 6 and 7, and those of FIG. 15. FIGS. 6 and 7 show the alignment of the holding clip 100 attached to upper support rail 30-*n*, with the length of panel 12, 12' perpendicular the length of support rail 30, as best seen in FIG. 3. FIG. 15 shows the alignment of the holding clip attached to an upper support rail 30-*n*, with the length of panel 12, 12' parallel to the length of support rail 30, best seen in FIG. 16. These two arrangements with different orientations of the length of panel 12, 12' with respect to the length of the upper support rail 30 are illustrative of the flexibility of the present inventive system. This flexibility is facilitated by the various arrangements of the different panel holding clips 100, 100' and 120, as depicted throughout the drawings. The wide range of holding clips 100, 100' and 120 complement the ability of the present invention to provide a very precise pre-arrangement of the inventive support system 10 for easy installation of the panels at the final staging site.

Specifically, once the upper support rail 30 or 30' are secured to the support joists 20, the solar panels (or other panel-like structures) either framed 12 or unframed 12' can be fastened to the rails using holding clips 100, 100' and 120. Notably, as will be discussed in more detail below, upper support rail 30' can also secure framed and unframed panels 12, 12', respectively, in pockets 39 (i.e. using framing clips 150 in the case of unframed panels 12').

Regarding panel holding clips 100, 100' and 120', as shown in FIGS. 3, 10, 11, 12 and 16, at least two types of panel holding clips are preferably used, i.e. end or single-panel clips 100, 100' and an intermediate or two-panel clip 120. The panel holding clips 100, 100', 120 encompass a wide variety of devices that hold or grip panel-like structures using a number of different methods. One is simple gravity. Another is the tightness of or pressure applied by the arms of the gasket encompassing a portion of the panel-like structure. More specifically, the gasket 130, 131 lining the clip can create spring-like pressure through deformation of the material. One example would be rubber or nylon teeth (described below and identified as teeth 140 and 153 in FIGS. 10, 11, and 12, as well as FIGS. 18A, 19A and 19B for panel framing clips 150, respectively). Yet another way to grip the panel is through an adhesive material used with the gasket 130, 131, to develop a bond with the portions of the panel-like structure being held. The gaskets used with holding clips 100, 100', 120 and/or framing clips 150 can be easily changed as needed, depending upon the position of the support structure 10, and the configuration of the panels 12, 12' supported thereby.

The single-panel holding clips 100, 100' have a generally Z-shaped profile with a base portion 110 and first wall 112. Holding clip 100 has a first flange 114 and uses an unfulcrumed U-shaped gasket 130. Clip 100', on the other hand, has a first flange and gasket that substantially match that of flange 124 and gasket 131 described in detail below with reference to the two-panel holding clip 120.

The two-panel holding clip 120 is generally U-shaped having a first extended flange 114, a second extended flange 124, a first wall 112, second wall 122 and a base portion 110, and uses two different gaskets 130, 131. Generally, both gaskets 130, 131 have a U-shaped cross-section with a fold 138, upper and lower contact surfaces, 132, 134, respectively, with a plurality of ribs 140, i.e. saw-tooth profiles, and a back wall 136.

Figure 12:
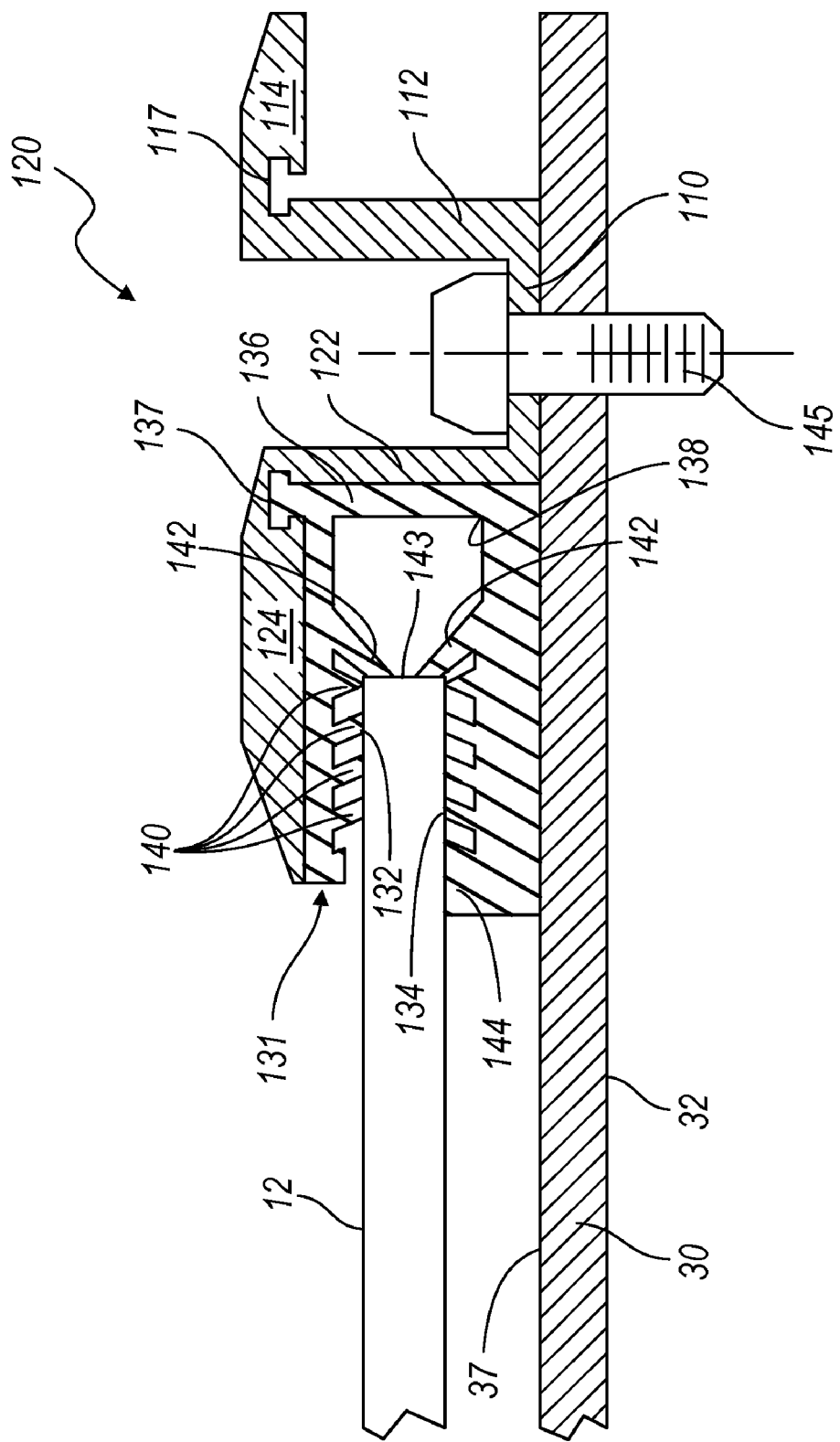
FIG. 12 is a sectional elevation view showing a panel fitted within the gasket of the two-panel clip, having rearmost retaining ribs, a fulcrum ridge and a saw-tooth profile.

The fulcrumed U-shaped clip gasket 131 preferably includes resilient, rearmost retaining ribs 142, designed to contact a top peripheral side 143 of the panel 12, 12' to push and hold the panel downward into the clip below. Notably, there may be one retaining rib 142 extending from the upper contact surface 132 and one extending from the lower contact surface 134 as shown in FIGS. 10 through 12, or, in the alternative, there may be just one large rib extending from either the upper or lower contact surfaces. Still further, retaining rib 142 may extend from the back wall 136, in which case the retaining rib 142 may be replaced with a spring to provide resiliency.

The lower contact surface 134 of the fulcrumed gasket 131 further includes a fulcrum point 144, i.e. an extended elongated ridge, which forces against the solar panel 12. 12' toward the upper contact surface 132 and second clip flange 124.

In use, the bottom portion of the two-panel holding clip 120 holds the top peripheral edge of the solar panel 12, 12' therebelow, aligned with the other solar panels in the respective column of panels. As best seen in FIGS. 10 and 11, the bottom portion of the holding clip 120 includes a second clip flange 124, which is longer than the opposing first clip flange 114, which holds the bottom of an uppermost solar panel 12, 12' in the same column. The top or first clip flange 114 of the two-panel holding clip 120 is preferably the same length as that of the flange of the bottom mounted single-panel holding clip 100, i.e. having the same U-shaped unfulcrumed clip gasket 130 used therewith. Preferably, the length of longer clip flange 124 is at least twice the length of the shorter first flange 114, so that the solar panel 12, 12' can be inserted first under flange 124, pivoted on fulcrum point 144 and then inserted under flange 114, whereby flanges 114, 124, gravity, and the resiliency, pressure and friction of the gaskets 130, 131, as described, hold the panel 12, 12' firmly in place once set in position.

The difference between single-panel holding clips 100 and 100' is that clip 100' is the first clip at the top of each upper support rail 30-*n* or 30'-n; while holding clip 100 is the last clip, i.e. at the bottom of each support rail 30-*n* or 30'-*n*. Since the single-panel holding clip 100' is the top clip of each upper support rail, it has a fulcrumed U-shaped gasket, identical to the fulcrumed gasket 131, to accommodate its extended flange profile (identical to flange 124). This is necessary since the top single-panel holding clip 100' forces against the top perimeter side 143 of the uppermost solar panel 12, aligned with the other solar panels in the respective column of panels, to push the bottom edge of the panel 12, 12' into the top portion of the two-panel holding clip 120 therebelow. Therefore, the profile of holding clip 100' substantially matches that of the bottom portion of the two-panel holding clip 120 to fit and secure the top perimeter edge of each solar panel therein.

Both of the clip gaskets 130, 131 preferably include a T-shaped engagement protuberance 137 for slidable registration and attachment via a complementary, somewhat T-shaped retaining groove 117 formed between the walls 112, 122 and their respective flanges 114, 124. Gaskets 130, 131 are used with each holding clip 100, 100', 120 to protect the front and back edges 143 of each solar panel 12. Each gasket 130, 132 is preferably extruded with the T-shaped mounting protuberance 137.

Preferably, the gaskets or clip liners 130, 131 are made of a material which is physically and chemically stable, and preferably electrically nonconductive. Furthermore, the gaskets 130, 131 should be of an electrically-resistant material and have good elasticity upon compression. Suitable materials, which can be employed include, but are not limited to, neoprene, butyl rubber, ethylene-propylene diene monomer (EPDM), chlorinated polyethylene (CPE) and a polytetrafluoroethylene (PTFE) material such as GORTEX® (a trademark of W. L. Gore & Associates, Inc.), or TEFLON® (a trademark of E.I. DuPont de Nemours & Company).

It is important to describe at this point, an additional structural benefit of support rails 30'. With reference to FIGS. 17 through 20, longitudinal pockets 39 of rails 30' can be used as an alternative method for conveniently securing panels 30, 30' to the bi-directional span 10. Using framing clips 150 spaced along each panel edge 143 of unframed panels 12', or simply using the frame of framed panels 12, each panel can be inserted and slid in place along the longitudinal pockets 39 of adjacent rails 30' as best seen in FIG. 18B (for framed panels 12) and 18C (for unframed panels 12'). Preferably, panels 12, 12' are slid in place and stacked in columns using the joist and rail orientation shown in FIG. 4A. However, panels 12, 12' may be aligned in rows using the joist and rail orientation shown in FIG. 13A. Caps and/or extended finger stops (not shown) are used at the end of the rails 30' to secure the panels within the corresponding columns or rows.

Regarding the framing clip 150 for unframed panels 12', each framing clip 150 preferably includes a framing clip bracket 154 fitted with a gasket 152 (engaged via bracket flange 155 and gasket groove 156), as best seen in FIGS. 19A and 19B. The gasket 152 further includes ribs 153 much like those of ribs 140 (discussed above with reference to panel holding clips 100, 100' and 120).

Spacers 159 are preferably used to maintain appropriate spacing between adjacent panels in columns or rows, as shown, for example, in FIG. 20. The spacers 159 can be constituted by a structure similar to double-sided holding clips 120 without the base portion 110 for bolt attachment. However, any other type of appropriate structure can be used. The spacers are important since the movement permitted by the holding clips 100, 100', and 120 or by movement in longitudinal pockets 39 may permit solar panels 12, 12' to become misaligned with respect to each other.

Most notably, the support system 10 of this invention allows for off-site assembly (at a convenient staging site) to precise engineering specifications, in that, once the support members are assembled, the bi-directional span can be folded or collapsed on itself, as shown with reference to FIGS. 5 and 14, and then easily transported to the installation site. The support system 10 is then positioned, and secured to the roof, rack, tracking unit, or other substrate via the tilt bracket 16 (or equivalent structure) while still in the folded position. More specifically, after attaching one support joist 20 to one of the brackets 16, using a pair of tilt bracket attachment bolts 240 (wedged between adjacent rails 30-2 and 30-3 in the folded position, as shown in FIGS. 5B and 5C), the assembly 10 is unfolded to the position of FIGS. 4A and 13A, and the other support joist 20 is attached to the second bracket 16, via a second pair of tilt bracket bolts 240. Of course, the same procedure is followed if rails 30' are used in place of rails 30.

The method of assembling the inventive support system 10 for an array of photovoltaic panels 12, 12' in columns and rows, includes the steps of building the bi-directional span by attaching support members, i.e. support joists 20 and upper support rails 30-n or 30'-n, using a plurality of attachment bolts 40 and nuts 45. The top surface 37 of each upper support rail 30-n or 30'-n must be unobstructed for the solar panels 12, 12' to be secure against. As previously described, each upper support rail 30-n or 30'-n has a substantial rectangular cross-section portion or an I-shaped cross-section portion, respectively. Preferably, upper support rail 30, 30' has an upper wall section 36, 36' and lower wall section 32, 32'.

Each individual support system 10 can be easily engineered, fabricated, assembled and adjusted to various specifications. For example, the longitudinal T-shaped sectional channel 33 in the lower wall section 32, 32' is adapted to adjustably receive the heads 42 of attachment bolts 40. Bolts 40 attach each upper support rail 30-n, 30'-n passing through one of the lower support joists 20. The T-shaped slotted channel 33 permits the bolt 40 to be placed at any location along the length of the channel and through the lower support joist 20 as shown in FIGS. 6 and 7 (for a first orientation of the support joist assembly) and FIG. 15 (for the second orientation of the support joist assembly). Notably, FIG. 18A can be considered to show attachment of rails 30' to joist 20 in either orientation.

Regarding holding clips 100, 100', 120, each clip can be pre-positioned and attached to the upper wall section 36, 36' of the upper support rails 30, 30', respectively, by a self-threading bolt 145 secured to the thick portion 38 and whose head engages the base portion 110 of the holding clip. The perimeter holding clips 100, 100', and 120 can be positioned and attached to the upper wall section 36, 36' of the upper support rails 30, 30' off-site to adhere to the proper engineering specifications for a specific installation. The positioning and necessary spacing for the columns and rows of the photovoltaic panels 12, 12' of the array can be optimally and easily made off-site during fabrication and assembly, without wasting space, time and materials.

Once the perimeter holding clips 100, 100', 120 and upper support rails 30-n or 30'-n are attached to the support joists 20 as described above, the bi-directional span of the support system 10 can be reduced in size by folding the upper support rails 30 relative to the support joists 20. The folded span can be easily shipped to the location for installation, then unfolded and secured to the roof, free-field ground rack, tracking unit, or other substrate for attachment of the photovoltaic panels 12, 12' via the pre-positioned, attached and properly spaced perimeter holding clips 100, 100', 120 (as shown in FIGS. 3 and 16) or framing clips 150 and spacers 160 (shown in FIGS. 18B, 18C and 20).

One preferred method to assemble the bi-directional span 10 is to align a first support joist 20 over tilt support bracket(s) 16 (or similar support structures), and to bolt the support joist 20 to the support bracket(s) 16 using bolts 240 secured within the folded structure, as shown in FIGS. 5B and 5C and previously discussed. Depending on the joist 20 to rail 30, 30' orientation, i.e. either that shown in FIG. 4A or 13A, the aligned support joist 20 will be attached first to one or two brackets. Connection is made to the tilt support bracket(s) 16 before anything else is done. Once connection is made, the bi-directional support structure 10 is unfolded sufficiently to allow a second support joist to be laid over the tilting support bracket(s) 16 so that the connection process can be repeated. It is important that the support joist 20 be provided with slots 216 (as depicted in FIGS. 3, 4A, 5B and/or 14) in order to facilitate on-site adjustment. It is preferred that all of the routed or punched slots 216 be carefully made during the pre-installation operation before a support structure 10 is shipped to the permanent installation site. The alignment in which support joists 20 are laid across two or more tilt support brackets 16 is that depicted in FIGS. 3 and 16. Once two support joists 20 are attached to their respective tilt brackets 16 (or similar structures), then the entirety of the bi-directional support structure 10 is ready for permanent attachment of the panels 12, 12'.

Notably, with the aforementioned connections made to the tilt brackets 16 (or some other substrate support), installation of the overall support structure 10 is relatively simple Very little technical skill is needed for this operation, and nominal measurement or alignment is required since the overall support structure 10 was pre-engineered, fabricated and assembled off-site. This ease of installation, while maintaining engineering specifications and measurements, is one of many major advantages of the present invention.

This important advantage of pre-engineering, fabrication and assembly conducted off-site at a plant or other convenient fabrication area, includes the precise measurements needed to place and drill or punch the connection holes 44 for proper alignment of the lower support joist 20 and upper support rails 30, 30'. More specifically, with reference to the joist-to-rail orientation shown in FIG. 4A, in the assembly process the support joists 20 are aligned to the position at which they will be connected to the tilt bracket 16 in the field. Next, connections are made between the first support joist 20 and the first upper support rail 30, 30' by inserting a bolt 40 in spaced, pre-drilled holes 44 passing through the support joist 20 with the bolt head 42 at the top of the support joist and a hex nut 45 at the bottom. A separation washer 24 is included near each bolt head. The process is repeated for the other horizontal support joist(s) 20. Next, a single upper support rail, i.e. either 30-1 or 30'-1, is aligned with the head 42 of the first bolt 40 located in position along the first lower support joist 20. The bolt head 42 is lifted, separated from the separation washer 24, and slid into the T-slot channel 33 in the upper support rail 30 or 30'. This step is then repeated for the other lower support joist(s) 20. The end of the first upper support rail 30-1 or 30'-1 is then aligned with a side wall of the first lower support joist 20, and the hex nuts 45 are torque snug to a predetermined torque value that permits rotation between joist 20 and upper rail 30, 30'. Using a machinist square, the horizontal support joist 20 is made perpendicular to the vertical support rail 30-1 or 30'-1. The other vertical rails 30-2 through 30-n or 30'-2 through 30'-n are assembled and secured in like fashion. Additionally, to reduce cost and/or to more conveniently tuck wires between rows and columns it should be noted that support rails 30 may be alternately or intermittently arranged with support rails 30' in the same assembly.

Of course the method for assembling the bi-directional span 10 having the second orientation, i.e. FIG. 13A, of support joists 20, is substantially the same as that described above for support joists oriented according to FIG. 4A. A first lower support joist 20 is aligned and bolts 40 are inserted in spaced, pre-drilled holes 44 passing through the lower support joist 20, with the bolt head 42 at the top of the joist and a hex nut 45 at the bottom. Again, the separation washer 24 is included near each bolt head. The process is repeated for the second and any subsequent vertical support joists 20. Next, a single upper support rail 30, i.e. using either cross-sectional design 30 or 30', is aligned with the head 42 of the first bolt 40 located in position along the first lower support joist 20. The bolt head 42 is lifted, separated from the separation washer 24, and slid into the T-slot channel 33. This step is repeated for all subsequent, lower support joists 20. Using a machinist square, the lower support joists 20 are made perpendicular to the upper support rails 30 or 30' (i.e. the upper support rail 30-1 or 30'-1 is aligned perpendicular with a side wall of each lower support joist 20), and all hex nuts 45 are torque to a predetermined value permitting rotation of joist and rail while maintaining the precise, intersecting position therebetween. The other rails 30-2 through 30-n or 30'-2 through 30'-n are then assembled and secured in like fashion.

As previously stated, bolts 40 and hex nuts 45 are used to securely fasten the lower support joists 20, as the case may be, to the corresponding upper support rails 30, 30'. As stated above, each hex nut 45 preferably includes a nylon insert. The nylon insert retains torque pressure of the fastener (at the predetermined value) during shipping and prevents the support rails 30 and/or 30' from loosening from the support joists 20 when folded and unfolded. Notably, on account of the separation washers 24 and the nylon hex nuts 45, the upper rails 30, 30' can pivot relative to the support joists 20 without any significant loosening. The assembled bi-directional span can be folded and unfolded by grasping the ends of two adjacent support joists, and pushing one of the lower support joists 20 longitudinally away relative to the second support joist 20, permitting the assembly to fold into a compacted form for shipping. Alternatively, the folding operation can be made just as easily by grasping the ends of two adjacent horizontal rails 30, 30' and pushing one longitudinally away relative to the other.

It is important to note for assembly and shipping purposes, that the tubular body forms 31, 31', having varied wall thickness 38, and channels 33, 34 substantially reduces the weight of the overall support rails 30-n or 30'-n, and, therefore, the overall weight of the assembled system in comparison to the prior art. Yet, because of the aforementioned selective reinforcement, the structural strength is enhanced.

As previously stated, the support structure 10 of the present invention facilitates simple and quick installation. After shipping the structure assembly 10 to the field for permanent installation, it is unpackaged, and the appropriate lower support joist 20 is aligned and secured to one or both of the vertical support elements 14, via the bottom attachment openings in the tilt bracket mounts 16, depending on the joist-to-rail orientation. For example, in the case of the assembly 10 having the orientation of support joists 20 as shown in FIG. 13A, either the right or left outside-most lower support joist 20 is aligned parallel, mounted and secured to the corresponding vertical support element 14, via the tilt bracket mounts 16. Then, the other outside-most lower support joist 20 is pushed to unfold and realign mutually parallel to the first support joist, i.e. perpendicular to the upper support rails 30, 30', so as to align mutually parallel to the other tilt bracket. The assembly 10 is securely fixed via the top attachment openings 216 in the corresponding support joists 20 to the tilt bracket mounts 16 using bracket attachment bolts 240 as previously described.

Notably, the space between the support joists 20 can be adjusted (if needed) by sliding the joists along the rails via their T-slot channels, so that the spacing of the joists 20 precisely align with and attach to the tilt bracket mounts 16. In contrast, it is not possible to easily adjust the space between the joists 11, 13 in the conventional design shown in FIGS. 1, 2A and 2B along its several conventional rails 15, since the spacing therebetween is fixed by the drilled bolt holes made in rails 15 through the side walls of channels 19.

Once the assembly of this invention is unfolded and the support joists 20 are secured to the tilt bracket mounts 16, the spacing and perpendicular relationship of the upper support rails 30 are checked relative to the side wall of the support joists 20 using a machinist square or similar setup fixture and adjusted if needed. The hex nuts 45 are also checked to assure that they continue to be snug after shipping and installation.

And finally, with the expanded bi-directional span properly positioned and secured to the support elements 14, each solar panel 12, 12' is fixed in place by sliding into rows or columns via the longitudinal pockets 39 (with reference to rails 30') or by using top holding clips 100, 100' or 120 (i.e. inserting the top of the panel into its top holding clip 100' or 120, then pivoted about the respective gasket fulcrums 144, to fit the panel's bottom edge into corresponding bottom gravity holding clips 100, 120, as best seen in FIGS. 10 through 12). To finish the installation, wires are tucked away in the corresponding C-shaped slotted channels 34. The proper spacing between panels is maintained by spacers 159, as depicted in FIG. 20.

While the invention has been particularly shown and described with reference to the specific preferred embodiments, it should be understood by those skilled in the art that various exchanges in form and detail may be made therein without departing from the spirit and scope of the invention as defined by the appended claims.

What is claimed is:

1. A method of assembling a support structure of intersecting upper panel rails and lower support joists to support an array of solar panels in columns and rows, said method comprising the steps of:
    (a) identifying characteristics of an installed configuration of said support structure, including relevant measurements of said support structure, panel holding components, upper panel rail profiles, and panels with respect to a selected installation site;
    (b) assembling said support structure in accordance with said characteristics of said installed configuration at a staging site, including the substeps of:
        i) forming holes in said lower support joists to receive fasteners,
        ii) placing insulating washers on said fasteners between said upper panel rails and said lower support joists, and
        iii) slidably connecting said upper panel rails and said lower support joists together using said fasteners connected to T-channel slots formed in bottom surfaces of said upper panel rails;
    (c) unitarily folding said assembled support structure into a collapsed, interconnected package appropriate for transport and subsequent unitary unfolding;
    (d) unitarily unfolding and installing said support structure according to said predetermined characteristics of said installed configuration at said installation site; and,
    (e) sliding said solar panels through panel holding components on adjacent upper panel rails.

2. The method of claim 1, wherein said solar panels are slid in panel holding components in a direction parallel to the longitude of said upper panel rails.

3. The method of claim 1, wherein said solar panels are slid in said panel holding components in a direction perpendicular to the longitude of said upper panel rails.

4. The method of claim 1, wherein step (e) of sliding said solar panels includes a sub-step of placing at least one external spacer between adjacent solar panels.

5. The method of claim 3, wherein said solar panels are slid into said panel holding components by deforming at least one portion of at least one said panel holding component by using said panel holding component as a pivoting fulcrum.

6. The method of claim 1, wherein step (b) of assembling said support structure further comprises an additional sub-step of tightening said connectors to a first torque value, permitting adjustable rotation and sliding of intersecting upper panel rails and lower support joists with respect to each other.

7. The method of claim 4, further comprising the step of:
    (f) tightening said panel holding components to said solar panels.

8. The method of claim 1, wherein step (d) of installing said support structure comprises a sub-step of connecting at least one said lower support joist to an external permanent substrate fixture.

9. The method of claim 2, wherein step (e) of sliding said panels includes sliding said solar panels between channeled pockets formed in two adjacent upper panel rails from a position at a side of said support structure.

10. The method of claim 3, wherein step (e) of sliding said solar panels is conducted from above said support structure, and one of said panel holding components include a deformable portion to receive said solar panel, and then forces said solar panel outward from said deformed portion of said panel holding component.

11. A collapsible panel support system constituted by an intersecting array of structural members including a first group of lower support joists and a second group of upper panel rails, said collapsible structure comprising:
    (a) connectors at intersections of said lower support joists and said upper panel rails that facilitate unitary rotation of all said lower support joists with respect to said upper panel rails, wherein said connectors comprise bolts having heads and each said upper panel rail comprises a T-channel slot configured to hold said bolt heads to facilitate a slidable connection along a length of said upper panel rail;
    (b) an insulating washer between said support joist and said upper panel rail at each said connector to facilitate folding and unfolding of said panel support structure in unison; and,
    (c) a plurality of panel holding components, each said panel holding component adapted to receive at least a portion of an edge of a panel to be supported by said collapsible panel support structure when said collapsible panel support structure is in a deployed state.

12. The panel support system of claim 10, wherein said panel holding components are adapted to provide a longitudinal pocket to permit sliding engagement of said panels between adjacent upper panel rails.

13. The panel support system of claim 12, wherein each panel holding component comprises a panel clip, and a gasket arrangement having opposing flexible teeth, slanted inward.

14. The panel support system of claim 11, further comprising at least one spacer arranged between adjacent panels.

15. The panel support system of claim 13, wherein said gasket arrangement further comprising a central concavity configured to operate as a fulcrum, and spring structure operational to force an engaged panel outward from said concavity.

16. The panel support system of claim 12, wherein at least a portion of the upper panel rails have an I-shape cross-section formed by an indentation along opposite parallel sides of a length of each respective rail, the indentations that form the longitudinal pockets of said panel holding components slideably receive the edge of said corresponding engaged.

17. The panel support system of claim 11, wherein each of said upper panel rails comprises a tubular structure with an external C-shaped channel to accommodate wiring traversing along said upper panel rails to supported panels.

* * * * *